(12) United States Patent
Lietz et al.

(10) Patent No.: US 9,501,345 B1
(45) Date of Patent: Nov. 22, 2016

(54) METHOD AND SYSTEM FOR CREATING ENRICHED LOG DATA

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 142 days.

(21) Appl. No.: 14/139,449

(22) Filed: Dec. 23, 2013

(51) Int. Cl.
G06F 11/00 (2006.01)
G06F 11/07 (2006.01)
G06F 11/30 (2006.01)

(52) U.S. Cl.
CPC ......... G06F 11/0784 (2013.01); G06F 11/301 (2013.01)

(58) Field of Classification Search
None
See application file for complete search history.

(56) References Cited

U.S. PATENT DOCUMENTS

| | | | |
|---|---|---|---|
| 5,712,641 A | 1/1998 | Casabona et al. | |
| 5,731,991 A | 3/1998 | Kinra et al. | |
| 6,085,224 A | 7/2000 | Wagner | |
| 6,205,552 B1 | 3/2001 | Fudge | |
| 6,343,236 B1 * | 1/2002 | Gibson et al. | 700/79 |
| 6,549,932 B1 | 4/2003 | McNally et al. | |
| 6,651,183 B1 * | 11/2003 | Gensler et al. | 714/4.3 |
| 7,114,183 B1 | 9/2006 | Joiner | |
| 7,296,261 B2 | 11/2007 | Witchel et al. | |
| 7,373,524 B2 | 5/2008 | Motsinger et al. | |
| 7,426,745 B2 | 9/2008 | McCarty | |
| 7,506,371 B1 | 3/2009 | Ben-Natan | |
| 7,552,424 B1 | 6/2009 | Bischof et al. | |
| 7,640,458 B2 | 12/2009 | Rao et al. | |
| 7,761,923 B2 | 7/2010 | Khuti et al. | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,944,355 B2 | 5/2011 | Kumar et al. | |
| 7,996,836 B1 | 8/2011 | McCorkendale et al. | |

(Continued)

FOREIGN PATENT DOCUMENTS

| | | |
|---|---|---|
| EP | 2 541 420 | 1/2013 |
| WO | WO 02/091182 | 11/2002 |

(Continued)

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Gabriel Chu
(74) *Attorney, Agent, or Firm* — Hawley Troxell Ennis & Hawley LLP; Philip McKay

(57) ABSTRACT

Access to first log data from a first log data source and second log data from a second log data source is obtained. Trigger event log data is defined and the second log data from the second log data source is monitored to detect the defined trigger event log data in the second log data. If the defined trigger event log data is detected in the second log data from the second log data source, the detected trigger event log data in the second log data from the second log data source is correlated with the first log data from the first log data source, and/or at least part of the second log data from the second log data source is inserted into the first log data from the first log data source.

16 Claims, 6 Drawing Sheets

(56) References Cited

U.S. PATENT DOCUMENTS

| | | |
|---|---|---|
| 8,001,422 B1 | 8/2011 | Sun et al. |
| 8,095,962 B2 | 1/2012 | Condon |
| 8,171,485 B2 | 5/2012 | Muller |
| 8,171,554 B2 | 5/2012 | Elovici et al. |
| 8,181,036 B1 | 5/2012 | Nachenberg |
| 8,281,399 B1 | 10/2012 | Chen et al. |
| 8,312,516 B1 | 11/2012 | Malatesta |
| 8,438,643 B2 | 5/2013 | Wiemer et al. |
| 8,510,821 B1 | 8/2013 | Brandwine et al. |
| 8,555,388 B1 | 10/2013 | Wang et al. |
| 8,561,126 B2 | 10/2013 | Ananthanarayanan et al. |
| 8,561,127 B1 | 10/2013 | Agrawal et al. |
| 8,572,733 B1 | 10/2013 | Rockwood |
| 8,615,785 B2 | 12/2013 | Elrod et al. |
| 8,621,618 B1 | 12/2013 | Ramsey et al. |
| 8,683,585 B1 | 3/2014 | Chen et al. |
| 8,688,820 B1 | 4/2014 | Bhogi et al. |
| 8,726,383 B2 | 5/2014 | Blackwell |
| 8,776,050 B2 | 7/2014 | Plouffe et al. |
| 8,813,225 B1 | 8/2014 | Fuller et al. |
| 8,990,935 B1 | 3/2015 | Cutts |
| 9,047,582 B2 | 6/2015 | Hutchinson et al. |
| 9,049,105 B1* | 6/2015 | Feinstein et al. |
| 9,112,841 B1 | 8/2015 | Brandwine et al. |
| 9,270,690 B2 | 2/2016 | Kraitsman et al. |
| 2002/0066034 A1 | 5/2002 | Schlossberg et al. |
| 2002/0099992 A1 | 7/2002 | Distler et al. |
| 2002/0116404 A1 | 8/2002 | Cha et al. |
| 2002/0138416 A1 | 9/2002 | Lovejoy et al. |
| 2002/0147803 A1 | 10/2002 | Dodd et al. |
| 2003/0046128 A1 | 3/2003 | Heinrich |
| 2003/0051154 A1 | 3/2003 | Barton et al. |
| 2003/0084327 A1 | 5/2003 | Lingafelt et al. |
| 2003/0088791 A1 | 5/2003 | Porras et al. |
| 2003/0110392 A1 | 6/2003 | Aucsmith et al. |
| 2003/0188191 A1 | 10/2003 | Aaron et al. |
| 2003/0195959 A1* | 10/2003 | Labadie et al. ............... 709/224 |
| 2003/0233438 A1 | 12/2003 | Hutchinson et al. |
| 2004/0006704 A1 | 1/2004 | Dahlstrom et al. |
| 2004/0181775 A1 | 9/2004 | Anonsen et al. |
| 2004/0237093 A1* | 11/2004 | Sluiman et al. ............... 719/318 |
| 2004/0249973 A1 | 12/2004 | Alkhatib et al. |
| 2004/0249974 A1 | 12/2004 | Alkhatib et al. |
| 2005/0018618 A1 | 1/2005 | Mualem et al. |
| 2005/0066309 A1 | 3/2005 | Creamer et al. |
| 2005/0091304 A1 | 4/2005 | Trayler |
| 2005/0114836 A1 | 5/2005 | Fu |
| 2005/0155013 A1 | 7/2005 | Carrigan |
| 2005/0172162 A1* | 8/2005 | Takahashi et al. ............... 714/4 |
| 2005/0182969 A1 | 8/2005 | Ginter et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1 | 2/2006 | Dispensa et al. |
| 2006/0037077 A1 | 2/2006 | Gadde et al. |
| 2006/0090206 A1 | 4/2006 | Ladner et al. |
| 2006/0101520 A1 | 5/2006 | Schumaker et al. |
| 2006/0184838 A1 | 8/2006 | Singonahalli et al. |
| 2006/0203739 A1 | 9/2006 | Padmanabhan et al. |
| 2006/0293940 A1 | 12/2006 | Tsyganskiy et al. |
| 2007/0027999 A1* | 2/2007 | Allen et al. ............... 709/238 |
| 2007/0079168 A1* | 4/2007 | Sivakumar et al. ............... 714/1 |
| 2007/0094711 A1 | 4/2007 | Corley et al. |
| 2007/0180509 A1 | 8/2007 | Swartz et al. |
| 2007/0185875 A1 | 8/2007 | Chang et al. |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2009/0007264 A1 | 1/2009 | Chatterjee et al. |
| 2009/0089682 A1 | 4/2009 | Baier et al. |
| 2009/0106838 A1 | 4/2009 | Clark et al. |
| 2009/0199273 A1 | 8/2009 | Yalamanchi |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0070964 A1 | 3/2010 | Blumfield et al. |
| 2010/0077203 A1 | 3/2010 | Ogawa et al. |
| 2010/0122317 A1 | 5/2010 | Yadav |
| 2010/0192220 A1 | 7/2010 | Heizmann et al. |
| 2010/0212010 A1 | 8/2010 | Stringer et al. |
| 2010/0217850 A1 | 8/2010 | Ferris |
| 2010/0251363 A1 | 9/2010 | Todorovic |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0306354 A1 | 12/2010 | DeHaan et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0047621 A1 | 2/2011 | Brando et al. |
| 2011/0055921 A1 | 3/2011 | Narayanaswamy et al. |
| 2011/0101109 A1 | 5/2011 | Bona et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2012/0005750 A1 | 1/2012 | Satish |
| 2012/0039336 A1 | 2/2012 | Richmond et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0151488 A1* | 6/2012 | Arcese et al. ............... 718/101 |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0303776 A1 | 11/2012 | Ferris |
| 2012/0304300 A1 | 11/2012 | Labumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0046667 A1 | 2/2013 | Hill et al. |
| 2013/0054792 A1 | 2/2013 | Sharaf |
| 2013/0055398 A1 | 2/2013 | Li et al. |
| 2013/0067067 A1* | 3/2013 | Miri et al. ............... 709/224 |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1 | 5/2013 | Raleigh et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247135 A1 | 9/2013 | Kundu et al. |
| 2013/0276108 A1 | 10/2013 | Blackwell |
| 2013/0276152 A1 | 10/2013 | Hirsch et al. |

(56) References Cited

U.S. PATENT DOCUMENTS

| | | |
|---|---|---|
| 2013/0291068 A1 | 10/2013 | Huang et al. |
| 2013/0291087 A1 | 10/2013 | Kailash et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0339514 A1 | 12/2013 | Crank et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0165130 A1 | 6/2014 | Zaitsev |
| 2014/0173738 A1 | 6/2014 | Condry et al. |
| 2014/0189680 A1 | 7/2014 | Kripalani |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1* | 2/2015 | Gurumurthy et al. ....... 714/38.1 |
| 2015/0095691 A1 | 4/2015 | Edwards |
| 2015/0106939 A1 | 4/2015 | Lietz et al. |
| 2015/0128246 A1 | 5/2015 | Feghali et al. |
| 2015/0128274 A1 | 5/2015 | Giokas |
| 2015/0150123 A1 | 5/2015 | Be'ery et al. |
| 2015/0229661 A1 | 8/2015 | Balabine et al. |
| 2015/0371044 A1 | 12/2015 | Horne et al. |

FOREIGN PATENT DOCUMENTS

| | | |
|---|---|---|
| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

\* cited by examiner

METHOD AND SYSTEM FOR CREATING ENRICHED LOG DATA

BACKGROUND

Distributed computing systems, such as cloud computing environments, typically consist of a multitude of resources, many of which operate in relative isolation. In addition, many of these resources are themselves comprised of multiple sub-components. For instance, a given cloud computing environment often hosts multiple applications and services, each of which often utilizes multiple virtual and non-virtual assets such as server instances, data storage instances, as well as non-virtual resources, such as third party access systems, and various "bare metal" resources.

A long standing problem associated with the diversity of components and elements operating in a given cloud computing environment has been the inability to accurately and efficiently identify and correlate related events taking place in different portions of the cloud. One reason correlating events in the cloud has proven so difficult is the fact that many of the resources hosted in a given cloud computing environment maintain their own log data in relative isolation. Consequently, while it might be easily understood why a given asset in a cloud computing environment experienced a given event if it were known that a related trigger event had taken place in another portion of the cloud, without this correlation of log data entries from two different log data sources, there is often no explanation for the occurrence of an event, or the behavior of a given asset, in the cloud computing environment.

As an illustrative example, assume a service provided through a cloud computing environment employs multiple virtual machine instances and the virtual machine instances are accessed via the Internet using variable sets of IP addresses assigned to the service by a cloud computing environment provider hosting the service. In this case, each of the virtual machine instances would typically maintain its own internal log data recording various log entries related to the events associated with that virtual machine instance, i.e., each virtual machine instance would be a source of log data associated with that virtual machine instance. In addition, in this specific illustrative example, the cloud computing environment provider would also maintain log data recording events associated with the cloud infrastructure, i.e., the cloud computing environment provider would be a source of log data entries associated with the cloud infrastructure. In addition, the service would typically maintain its own log data, often consisting of the collection of log data from each of the associated virtual machine instances.

For the purposes of illustration, assume one or more of the IP addresses assigned to the service by the cloud computing environment provider are cancelled/destroyed by the cloud computing environment provider. In this case, log entry data associated with the cloud infrastructure would indicate the event of the one or more IP addresses being cancelled. In addition, the log data for each of the virtual machine instances using the cancelled IP addresses would undoubtedly also include log entry data indicating the events of these resources dropping offline.

Using current systems, the log data for each of the virtual machine instances would not be correlated with the log data associated with the cloud infrastructure. Consequently, considerable time and energy could be expended to "discover" that the IP addresses associated with the virtual machine instances we destroyed at the infrastructure level and that this event was the cause of these virtual machine instances dropping offline. However, if the log entry data associated with the cloud infrastructure indicating the destruction of the IP addresses were correlated with the log entry data from the virtual machine instances indicating the instances dropped offline, it would be immediately apparent why the virtual machine instances dropped offline.

What is needed is a method and system for correlating, and/or supplementing, log entry data from two different log data sources in a cloud environment when one or more trigger events connecting the log entry data from the two different log data sources is detected.

SUMMARY

In accordance with one embodiment, a method and system for creating enriched log data includes obtaining access to first log data from a first log data source. In one embodiment, access to second log data from a second log data source is also obtained. In one embodiment, the second log data source is distinct from the first log data source such that the second log data is external log data with respect to the first log data.

In one embodiment, a trigger event is defined and trigger event log entry data indicating the trigger event has occurred is defined. In one embodiment, the second log data from the second log data source is monitored to detect the defined trigger event log entry data in the second log data from the second log data source. In one embodiment, if the defined trigger event log entry data in the second log data from the second log data source is detected, the detected trigger event log entry data in the second log data from the second log data source is correlated with the first log data from the first log data source.

In accordance with one embodiment, a method and system for creating enriched log data includes obtaining access to first log data from a first log data source. In one embodiment, access to second log data from a second log data source is also obtained. In one embodiment, the second log data source is distinct from the first log data source such that the second log data is external log data with respect to the first log data.

In one embodiment, a trigger event is defined and trigger event log entry data indicating the trigger event has occurred is defined. In one embodiment, the second log data from the second log data source is monitored to detect the defined trigger event log entry data in the second log data from the second log data source. In one embodiment, if the defined trigger event log entry data in the second log data from the second log data source is detected, at least part of the second log data from the second log data source is inserted into the first log data of the first log data source.

Figure 1:
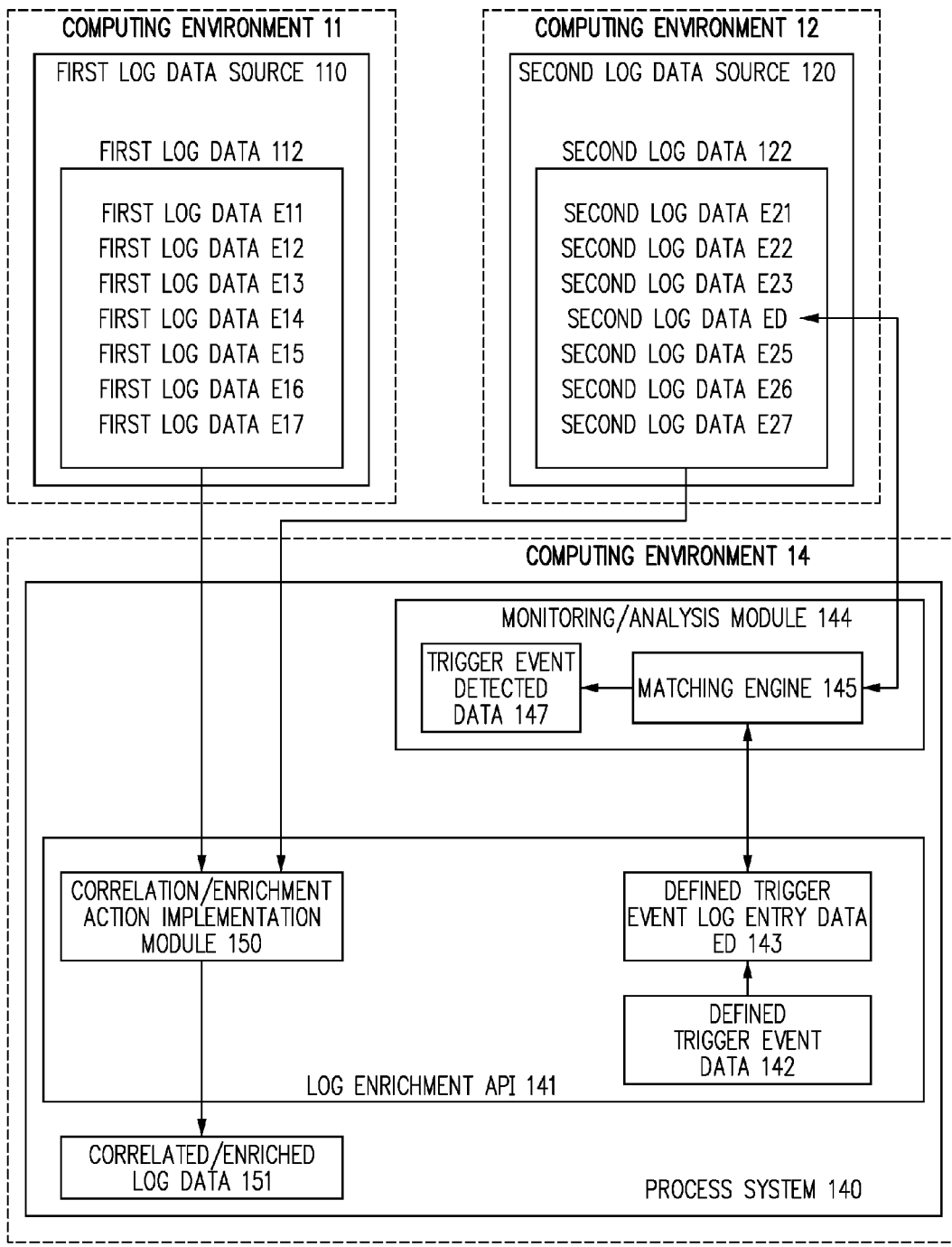
FIG. 1 is a functional block diagram showing the interaction of various elements for implementing one embodiment of a process for creating enriched log data.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for creating enriched log data includes a process for creating enriched log data implemented, at least in part, by one or more computing systems.

As used herein, the term "computing system", includes, but is not limited to, a server computing system; a workstation; a desktop computing system; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for creating enriched log data are logically or physically located, and/or associated with, one or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party, and/or any computing systems, and/or networks of computing systems, associated with, known by, and/or controlled by, a party. Examples of untrusted computing environments include, but are not limited to, public networks, such as the Internet, various cloud computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations, a party may wish to transfer data between two trusted computing environments, and/or two untrusted computing environments.

In one embodiment, one or more computing systems, and/or one or more computing environments, are connected by one or more communications systems, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between one or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between one or more computing systems, whether available or known at the time of filing or as later developed.

FIG. 1 is a functional diagram of the interaction of various elements associated with one embodiment of the method and system for creating enriched log data discussed herein. Of particular note, the various elements in FIG. 1 are shown for illustrative purposes as being associated with specific computing environments, such as computing environment 11, computing environment 12, and computing environment 14. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more computing environments or systems, and/or architectural or infrastructure components, such as one or more hardware systems, one or more software systems, one or more data centers, one or more clouds or cloud types, one or more third party service capabilities, or any other computing environments, architectural, and/or infrastructure components, as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center, a party, and/or entity providing all, or a portion, of a cloud-based computing environment or infrastructure, the owner or provider of a service, the owner or provider of one or more resources accessible via one or more computing environments, and/or any other party, and/or entity providing one or more functions, and/or any other party, and/or entity, as discussed herein, and/or as known in the art at the time of filing, and/or as made known after the time of filing.

In accordance with one embodiment, access to first log data from a first log data source is obtained. In various embodiments, the first log data source is a log data source for which it is desired to provide enriched log data correlating, and/or supplementing, the first log data associated with, and generated by, the first log data source. In various embodiments, there can be multiple first log data sources, i.e., log data sources for which it is desired to provide enriched log data.

In accordance with one embodiment, access to second log data from a second log data source is obtained. In accordance with one embodiment, and as discussed below, the second log data source is a log data source from which it is desired to obtain log enrichment data correlating, and/or supplementing, the first log data associated with, and generated by, the first log data source. In various embodiments, there can be multiple second log data sources, i.e. log data sources from which it is desired to obtain log enrichment data.

In one embodiment, the term "log data source" includes, but is not limited to, any virtual or non-virtual source of log data including, but not limited to, a cloud computing infrastructure, and/or cloud computing infrastructure provider; a service provided through cloud computing environment, and/or a service provider; an application provided through cloud computing environment, and/or an application provider; and/or any virtual or non-virtual asset operating within, or associated with, and or utilized by, one or more resources operating within, or associated with, one or more computing environments, such as a cloud computing environment.

As used herein, the term "virtual asset" includes any virtualized entity or resource, and/or a software subsystem of an actual, or "bare metal" entity. In various embodiments, virtual assets can be, but are not limited to, virtual machines, virtual servers and instances implemented in a cloud computing environment; administrative and/or data store instances implemented, or associated with, a cloud computing environment; service related instances associated with, and or delivered through, a cloud computing environment; and/or any other virtualized assets and/or sub-systems of "bare metal" physical devices, as discussed herein, and/or as known/available in the art at the time of filing, and/or as developed/made available after the time of filing.

As an even more specific example, in various embodiments, the log data sources can include, but are not limited to, a virtual machine instance; a virtual server instance; a virtual data store instance; a database or data store; any instance in a cloud computing environment; a cloud computing environment access system; part of a mobile device; part of a remote sensor; part of a laptop computing system; part of a desktop computing system; part of a point-of-sale computing system; and part of an ATM; a server computing system; a workstation; a storage cluster; a switching system; a router; any hardware system; any communications system; any form of proxy system; a gateway system; a firewall system; a load balancing system; a bastion host; an application; an account; an external accessibility monitoring service; an enterprise; a service; a database or data store; a computing environment access system; an external operational monitoring service; a mobile device; a remote sensor; a laptop computing system; a desktop computing system; a point-of-sale computing system; an ATM; or any other virtual or non-virtual asset as discussed herein, and/or as known in the art at the time of filing, and/or as becomes known after the time of filing.

In one embodiment, the log data sources are virtual assets instantiated in one or more computing environments using a virtual asset creation system such as a virtual asset creation template through which the creator of the log data source can generate log data source creation data.

In various embodiments, each of the log data sources includes the capability of recording log entry data, also referred to herein as log data entries. In various embodiments, the log data entries indicate various operations, functions, occurrences, and events related to each individual log data source. Specific illustrative examples of log entry data include data indicating one or more of, performance metrics; peer communication and peer communication attempts; user interaction and log data source availability; failed access attempts; successful access attempts; account creation; the setting of security requirements, such as multiple factor authentication requirements; the removal or addition of security requirements; the creation or changing of access control lists; and/or any other activity, function, occurrence, or event, associated with, caused by, or imposed upon, the log data sources. As noted above, currently, the log data entries associated with a given log data source are typically recorded and maintained in isolation from the other log data sources operating within the same computing environment, such as a cloud computing environment, and in many cases those within the same application or service.

Referring to FIG. 1, first log data source 110 and second log data source 120 are shown as instantiated and/or deployed in computing environment 11 and computing environment 12, respectively.

As discussed above, despite the fact that, in this specific illustrative example of FIG. 1, first log data source 110 is shown as being implemented in computing environment 11 and second log data source 120 is shown as being implemented in computing environment 12, this placement of first log data source 110 and second log data source 120 is made for illustrative purposes only. Consequently, in various embodiments, first log data source 110 and second log data source 120 can be implemented in the same computing environment, such as, but not limited to, the same cloud computing environment. In other embodiments, first log data source 110 and second log data source 120 can be implemented in different computing environments, including, but not limited to a cloud computing environment and a computing environment outside the cloud computing environment.

As also seen in FIG. 1, first log data source 110 includes first log data 112, including first log data entry E11, first log data entry E12, first log data entry E13, first log data entry E14, first log data entry E15, first log data entry E16, and first log data entry E17. In various embodiments, each of the first log data entries E11 through E17 represents a log data entry associated with an operation or event directly affecting first log data source 110.

Likewise, as also seen in FIG. 1, second log data source 120 includes second log data 122, including second log data entry E21, second log data entry E22, second log data entry E23, second log data entry ED, second log data entry E25, second log data entry E26, and second log data entry E27. In various embodiments, each of the second log data entries E21 through E27 represents a log data entry associated with an operation or event directly affecting second log data source 120.

While only seven log data entries are shown in FIG. 1 for both first log data source 110 and second log data source 120, those of skill in the art will readily recognize that, in various embodiments, any number of log data entries can be part of first log data 112 and second log data 122. In addition, those of skill in the art will readily recognize that the number of log data entries in first log data 112 will typically not be equal to the number of log data entries in second log data 122. Indeed, those of skill in the art will readily recognize that, in an actual implementation, first log data 112 is typically a continuous stream of log data entries, as is second log data 122.

In addition, in the illustrative example of FIG. 1, only two log data sources, i.e., first log data source 110 and second log data source 120, are shown for simplicity. However, in various embodiments any number of log data sources can be deployed of any number of different types.

As noted above, currently, the various log data sources operating within a cloud computing environment, and or associated with a cloud computing environment, maintain log data, including log entry data, indicating the occurrence of various events associated with the individual log data sources. As also noted above, currently, the various log data sources operate and maintain their respective log entry data in virtual isolation from other log data sources operating within, and/or associated with, the same cloud computing environment. As also noted above, this fact contributes to the prior art inability to correlate various events affecting log data sources operating in the same cloud computing environment, or even within the same application or service. As a result, currently, significant amounts of time and energy are devoted to manually performing forensic analysis to determine that various events occurring within the cloud computing environment, or a common application or service, are connected in a cause-and-effect relationship. In short, currently, there is no effective and efficient mechanism for correlating log entry data of two or more log data sources that are, in fact, connected by a common event.

To address this issue, in one embodiment, one or more trigger events are defined. In various embodiments, the trigger events defined are those events that are likely to have an effect on one or more log data sources, i.e., are likely to have a cause-and-effect relationship with one or more log data sources in a cloud computing environment. In various embodiments, the trigger events can be from outside an application, relevant to the application, yet independent of the application such as, but not limited to, the deletion of a user account or an "Internet network storm" that could impact the performance.

In various embodiments, a given use case associated with a first log data source is identified, such as a service or application utilizing the log data source. In one embodiment, the defined use case is used to determine what other log data sources, such as a second log data source, will be used to obtain enrichment, or supplementary, second log data to be correlated, and/or added to, the first log data of the first log data source. In addition, the identified use case associated with the first log data source is used to determine the trigger events of interest associated with the second log data source, and that would be recorded in the second log data of the second log data source.

As specific illustrative examples, in various embodiments, trigger events can be, but are not limited to, one or more of, account creation events; the setting of security requirements, such as multiple factor authentication requirements; the removal or addition of security requirements; the creation or changing of access control lists; the creation and or removal of communications channels; performance metrics analysis or results; peer communications and peer communication attempts; user interaction and log data source availability events; failed access attempts; successful access attempts; the abnormal termination of an application; the increase of error rates in response to customer requests; the detection that an Internet networking event that may impact performance is happening; the alerting by a third party of a denial of service attack; a change in the topology or layout used in the deployment of an application; information, such as a breach into a digital certificate provider, that may alter the security characteristics of an application; and/or any other activity, function, occurrence, or event, associated with, caused by, or imposed upon, one or more log data sources.

In one embodiment, once the trigger events of interest are defined, trigger event log entry data is defined which represents log entry data that would be expected to appear in the second log data generated by the second log data source if the trigger event were to occur. In short, data indicating a log entry in the second log data of the second log data source associated with the defined trigger event is defined and recorded.

Returning to FIG. 1, defined trigger event data 142 is provided through log enrichment Application Program Interface (API) 141 and defines the trigger events of interest associated with second log data source 120. As also seen in FIG. 1, defined trigger event data 142 is used to generate defined trigger event log entry data ED 143.

As seen in FIG. 1, log enrichment API is provided as part of a process system 140 which also includes monitoring/analysis module 144 and correlated/enriched log data 151 generated, in one embodiment, by correlation/enrichment action implementation module 150 of log enrichment API 141.

As also seen in FIG. 1, in this specific illustrative example, process system 140 is implemented in computing environment 14 that, in this specific illustrative example, is a third computing environment distinct from both computing environment 11 and computing environment 12. As noted above, this particular implementation scheme is shown for illustrative purposes only and, in other embodiments, first log data source 110, second log data source 120, and process system 140 can all, or in any combination, be implemented in the same computing environment.

In one embodiment, once the defined trigger event log entry data associated with the defined trigger event is defined, the second log data generated by the second log data source is monitored, e.g., read or scanned, to identify a log data entry in the second log data of the second log data source matching the defined trigger event log data entry data.

In one embodiment, if a log data entry in the second log data of the second log data source matching the defined trigger event log data entry data is detected, one or more correlation and or supplementation/enrichment actions are taken to indicate, and/or add data indicating, a connection between the detected matching log data entry in the second log data and the first log data of the first log data source.

Returning to FIG. 1, monitoring/analysis module 144 of process system 140 is used to monitor second log data 122 and read/scan each of second log data entries E21 through E27, including second log data entry ED. As also seen in FIG. 1, defined trigger event log entry data ED 143 is provided to monitoring/analysis module 144. As seen in FIG. 1, each of the second log data entries E21 through E27, and defined trigger event log entry data ED 143, are provided as input data to matching engine 145 of monitoring/analysis module 144 to identify any of second log data entries E21 through E27 that match defined trigger event log entry data ED 143.

As seen in FIG. 1, in this specific illustrative example, using matching engine 145, monitoring/analysis module 144 detects a match between second log data entry ED of second log data 122 and defined trigger event log entry data ED 143. As a result, trigger event detected data 147 is generated and provided to correlation/enrichment action implementation module 150.

In one embodiment, if a log data entry in the second log data of the second log data source matching the defined trigger event log data entry data is detected, the correlation and/or supplementation/enrichment action taken includes inserting linking data into the first log data stream of the first log data source indicating that the first log data should be read with, or in light of, the detected trigger event log entry data of the second log data from the second log data source, and/or a portion of, or the entirety of, the second log data from the second log data source.

In this way, the first log data from the first log data source and the second log data from the second log data source are connected so that the first log data from the first log data source can be interpreted using at least the part of the second log data from the second log data source indicating the defined trigger event took place.

In various embodiments, the linking data is inserted into the first log data from the first log data source manually, e.g., via a human interface and human interaction; or semi-automatically, e.g., subject to review and/or approval; or automatically, e.g., without subsequent review or approval.

In one embodiment, if a log data entry in the second log data of the second log data source matching the defined trigger event log data entry data is detected, the correlation and/or supplementation/enrichment action taken includes generating correlated/enriched log data in a separate log data stream including the detected trigger event log entry data of the second log data from the second log data source, and/or a portion of, or the entirety of, the second log data from the second log data source.

In this embodiment, the first log data from the first log data source and the correlated/enriched log data in the separate log data stream, including the detected trigger event log entry data of the second log data from the second log data source, are connected so that the first log data from the first log data source can be interpreted using at least the part of the second log data from the second log data source indicating the defined trigger event took place.

In various embodiments, the correlated/enriched log data is generated in the separate log data stream manually, e.g., via a human interface and human interaction; or semi-automatically, e.g., subject to review and/or approval; or automatically, e.g., without subsequent review or approval.

In one embodiment, if a log data entry in the second log data of the second log data source matching the defined trigger event log data entry data is detected, the correlation and/or supplementation/enrichment action taken includes inserting at least a relevant portion of the second log data of the second log data source directly into the first log data of the first log data source. In one embodiment, the relevant portion of the second log data inserted into the first log data includes, but is not limited to, the log data entry in the second log data of the second log data source matching the defined trigger event log data entry data.

In this embodiment, the first log data from the first log data source is directly supplemented and enriched using the relevant portion of the second log data from the second log data source indicating that the defined trigger event has occurred. Consequently, any review of the first log data from the first log data source directly indicates the occurrence of the defined trigger event so that the original log data entries in the first log data can be interpreted in light of the occurrence of the defined trigger event.

As noted above, in various embodiments, the insertion of the relevant portion of the second log data from the second log data source into the first log data of the first log data source is accomplished using a log enrichment API through which a user, such as an application or service provider, can specifically request insertion of relevant second log data.

In various embodiments, the relevant portion of the second log data from the second log data source is inserted into the first log data of the first log data source manually, e.g., via human interaction with the log enrichment API; or semi-automatically, e.g., subject to review and/or approval through the log enrichment API; or automatically, e.g., based on instructions provided through the log enrichment API, but without subsequent review or approval.

Returning to FIG. 1, correlation/enrichment action implementation module 150 is shown as part of log enrichment API 141 of process system 140. As discussed above, in various embodiments, correlation/enrichment action implementation module 150 receives trigger event detected data 147 and then accesses second log data 120 of second log data source 120, and/or first log data 112 of first log data source 110, and uses the accessed data to generate correlated/enriched log data 151.

Using one or more of the methods and systems for creating enriched log data discussed herein, log data from two or more log data sources can be effectively and efficiently correlated, and or supplemented, to connect events, and the consequences of those events, on multiple components, assets, and/or resources implemented in different portions of a given computing environment, such as a cloud computing environment, and/or in different computing environments. Consequently, using one or more of the methods and systems for creating enriched log data discussed herein, cause-and-effect relationships within one or more computing environments are automatically identified without the need to devote significant time and resources.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for creating enriched log data includes obtaining access to first log data from a first log data source. In one embodiment, access to second log data from a second log data source is also obtained. In one embodiment, the second log data source is distinct from the first log data source such that the second log data is external log data with respect to the first log data.

In one embodiment, a trigger event is defined and trigger event log entry data indicating the trigger event has occurred is defined. In one embodiment, the second log data from the second log data source is monitored to detect the defined trigger event log entry data in the second log data from the second log data source. In one embodiment, if the defined trigger event log entry data in the second log data from the second log data source is detected, the detected trigger event log entry data in the second log data from the second log data source is correlated with the first log data from the first log data source.

Figure 3:
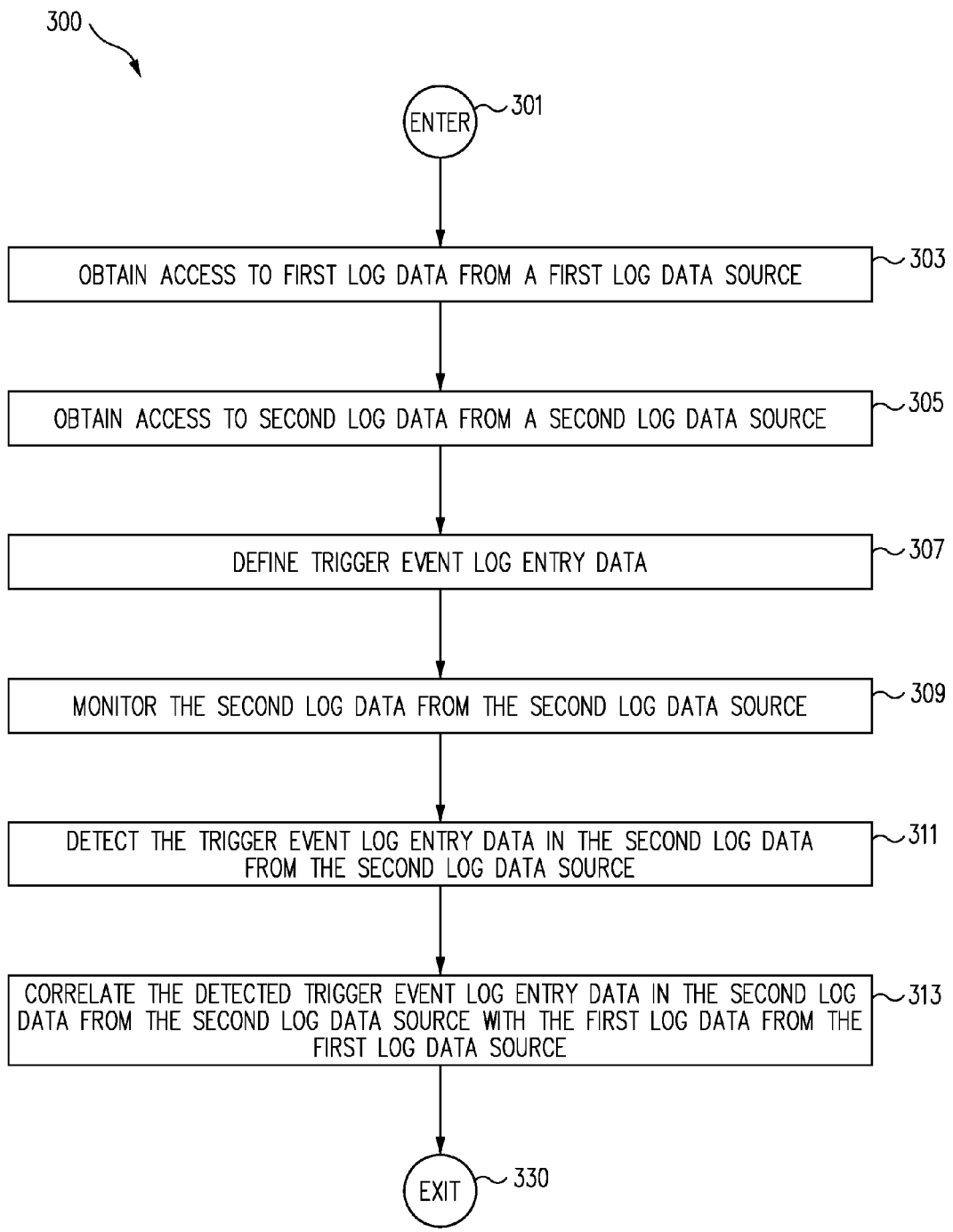
FIG. 3 is a flow chart depicting a process for creating enriched log data in accordance with one embodiment.

FIG. 3 is a flow chart of a process 300 for creating enriched log data in accordance with one embodiment. In one embodiment, process 300 for creating enriched log data begins at ENTER OPERATION 301 of FIG. 3 and process flow proceeds to OBTAIN ACCESS TO FIRST LOG DATA FROM A FIRST LOG DATA SOURCE OPERATION 303.

In one embodiment, at OBTAIN ACCESS TO FIRST LOG DATA FROM A FIRST LOG DATA SOURCE OPERATION 303 access to first log data from a first log data source is obtained.

In various embodiments, the first log data source of OBTAIN ACCESS TO FIRST LOG DATA FROM A FIRST LOG DATA SOURCE OPERATION 303 is a log data source for which it is desired to provide enriched log data correlating, and/or supplementing, the first log data associated with, and generated by, the first log data source.

In various embodiments, there can be multiple first log data sources, i.e., log data sources for which it is desired to provide enriched log data at OBTAIN ACCESS TO FIRST LOG DATA FROM A FIRST LOG DATA SOURCE OPERATION 303.

In one embodiment, once access to first log data from a first log data source is obtained at OBTAIN ACCESS TO FIRST LOG DATA FROM A FIRST LOG DATA SOURCE OPERATION 303, process flow proceeds to OBTAIN ACCESS TO SECOND LOG DATA FROM A SECOND LOG DATA SOURCE OPERATION 305.

In one embodiment, at OBTAIN ACCESS TO SECOND LOG DATA FROM A SECOND LOG DATA SOURCE OPERATION 305 access to second log data from a second log data source is obtained.

In accordance with one embodiment, and as discussed below, the second log data source of OBTAIN ACCESS TO SECOND LOG DATA FROM A SECOND LOG DATA SOURCE OPERATION 305 is a log data source from which it is desired to obtain log enrichment data correlating, and/or supplementing, the first log data associated with, and generated by, the first log data source of OBTAIN ACCESS TO FIRST LOG DATA FROM A FIRST LOG DATA SOURCE OPERATION 303. In various embodiments, there can be multiple second log data sources, i.e. log data sources from which it is desired to obtain log enrichment data at OBTAIN ACCESS TO SECOND LOG DATA FROM A SECOND LOG DATA SOURCE OPERATION 305.

In one embodiment, the term "log data source" as used in connection with OBTAIN ACCESS TO FIRST LOG DATA FROM A FIRST LOG DATA SOURCE OPERATION 303 and OBTAIN ACCESS TO SECOND LOG DATA FROM A SECOND LOG DATA SOURCE OPERATION 305 includes, but is not limited to, any virtual or non-virtual source of log data including, but not limited to, a cloud computing infrastructure, and/or cloud computing infrastructure provider; a service provided through cloud computing environment, and/or a service provider; an application provided through cloud computing environment, and/or an application provider; and/or any virtual or non-virtual asset operating within, or associated with, and or utilized by, one or more resources operating within, or associated with, one or more computing environments, such as a cloud computing environment.

As used herein, the term "virtual asset" includes any virtualized entity or resource, and/or a software subsystem of an actual, or "bare metal" entity. In various embodiments, virtual assets can be, but are not limited to, virtual machines, virtual servers and instances implemented in a cloud computing environment; administrative and/or data store instances implemented, or associated with, a cloud computing environment; service related instances associated with, and or delivered through, a cloud computing environment; and/or any other virtualized assets and/or sub-systems of "bare metal" physical devices, as discussed herein, and/or as known/available in the art at the time of filing, and/or as developed/made available after the time of filing.

As an even more specific example, in various embodiments, the log data sources can include, but are not limited to, a virtual machine instance; a virtual server instance; a virtual data store instance; a database or data store; any instance in a cloud computing environment; a cloud computing environment access system; part of a mobile device; part of a remote sensor; part of a laptop computing system; part of a desktop computing system; part of a point-of-sale computing system; and part of an ATM; a server computing system; a workstation; a storage cluster; a switching system; a router; any hardware system; any communications system; any form of proxy system; a gateway system; a firewall system; a load balancing system; a bastion host; an application; an account; an external accessibility monitoring service; an enterprise; a service; a database or data store; a computing environment access system; an external operational monitoring service; a mobile device; a remote sensor; a laptop computing system; a desktop computing system; a point-of-sale computing system; an ATM; or any other virtual or non-virtual asset as discussed herein, and/or as known in the art at the time of filing, and/or as becomes known after the time of filing.

In one embodiment, the log data sources are virtual assets instantiated in one or more computing environments using a virtual asset creation system such as a virtual asset creation template through which the creator of the log data source can generate log data source creation data.

In various embodiments, each of the log data sources of OBTAIN ACCESS TO FIRST LOG DATA FROM A FIRST LOG DATA SOURCE OPERATION 303 and OBTAIN ACCESS TO SECOND LOG DATA FROM A SECOND LOG DATA SOURCE OPERATION 305 includes the capability of recording log entry data, also referred to herein as log data entries. In various embodiments, the log data entries indicate various operations, functions, occurrences, and events related to each individual log data source. Specific illustrative examples of log entry data include data indicating one or more of, performance metrics; peer communication and peer communication attempts; user interaction and log data source availability; failed access attempts; successful access attempts; account creation; the setting of security requirements, such as multiple factor authentication requirements; the removal or addition of security requirements; the creation or changing of access control lists; and/or any other activity, function, occurrence, or event, associated with, caused by, or imposed upon, the log data sources. As noted above, currently, the log data entries associated with a given log data source are typically recorded and maintained in isolation from the other log data sources operating within the same computing environment, such as a cloud computing environment, and in many cases those within the same application or service.

In one embodiment, once access to second log data from a second log data source is obtained at OBTAIN ACCESS TO SECOND LOG DATA FROM A SECOND LOG DATA SOURCE OPERATION 305, process flow proceeds to DEFINE TRIGGER EVENT LOG ENTRY DATA OPERATION 307.

As noted above, currently, the various log data sources operating within a cloud computing environment, and or associated with a cloud computing environment, of OBTAIN ACCESS TO FIRST LOG DATA FROM A FIRST LOG DATA SOURCE OPERATION 303 and OBTAIN ACCESS TO SECOND LOG DATA FROM A SECOND LOG DATA SOURCE OPERATION 305 maintain log data including log entry data indicating the occurrence of various events associated with the individual log data sources.

As also noted above, currently, the various log data sources of OBTAIN ACCESS TO FIRST LOG DATA FROM A FIRST LOG DATA SOURCE OPERATION 303 and OBTAIN ACCESS TO SECOND LOG DATA FROM A SECOND LOG DATA SOURCE OPERATION 305 operate and maintain their respective log entry data in virtual isolation from other log data sources operating within, and/or associated with, the same cloud computing environment.

As also noted above, this fact contributes to the prior art inability to correlate various events affecting log data sources operating in the same cloud computing environment, or even those within the same application or service. As a result, currently, significant amounts of time and energy are devoted to manually performing forensic analysis to determine that various events occurring within the cloud computing environment, or a common application or service, are connected in a cause-and-effect relationship. In short, currently, there is no effective and efficient mechanism for correlating log entry data of two or more log data sources that are, in fact, connected by a common event.

To address this issue, in one embodiment, at DEFINE TRIGGER EVENT LOG ENTRY DATA OPERATION 307 one or more trigger events are defined. In various embodiments, the trigger events defined at DEFINE TRIGGER EVENT LOG ENTRY DATA OPERATION 307 are those events that are likely to have an effect on one or more log data sources of OBTAIN ACCESS TO FIRST LOG DATA FROM A FIRST LOG DATA SOURCE OPERATION 303, i.e., are likely to have a cause-and-effect relationship with one or more log data sources of OBTAIN ACCESS TO FIRST LOG DATA FROM A FIRST LOG DATA SOURCE OPERATION 303 in a cloud computing environment. In various embodiments, the trigger events can be from outside an application, relevant to the application, yet independent of the application such as, but not limited to, the deletion of a user account or an "Internet network storm" that could impact the performance.

In various embodiments, at DEFINE TRIGGER EVENT LOG ENTRY DATA OPERATION 307 a given use case associated with a first log data source of OBTAIN ACCESS TO FIRST LOG DATA FROM A FIRST LOG DATA SOURCE OPERATION 303 is identified, such as a service or application utilizing the log data source.

In one embodiment, the defined use case is used at DEFINE TRIGGER EVENT LOG ENTRY DATA OPERATION 307 to determine what other log data sources, such as a second log data source of OBTAIN ACCESS TO SECOND LOG DATA FROM A SECOND LOG DATA SOURCE OPERATION 305, will be used to obtain enrichment, or supplementary, second log data to be correlated, and/or added to, the first log data of the first log data source of OBTAIN ACCESS TO FIRST LOG DATA FROM A FIRST LOG DATA SOURCE OPERATION 303. In addition, at DEFINE TRIGGER EVENT LOG ENTRY DATA OPERATION 307 the identified use case associated with the first log data source is used to determine the trigger events of interest associated with the second log data source, and that would be recorded in the second log data of the second log data source of OBTAIN ACCESS TO SECOND LOG DATA FROM A SECOND LOG DATA SOURCE OPERATION 305.

As specific illustrative examples, in various embodiments, trigger events of DEFINE TRIGGER EVENT LOG ENTRY DATA OPERATION 307 can be, but are not limited to, one or more of, account creation events; the setting of security requirements, such as multiple factor authentication requirements; the removal or addition of security requirements; the creation or changing of access control lists; the creation and or removal of communications channels; performance metrics analysis or results; peer communications and peer communication attempts; user interaction and log data source availability events; failed access attempts; successful access attempts; the abnormal termination of an application; the increase of error rates in response to customer requests; the detection that an Internet networking event that may impact performance is happening; the alerting by a third party of a denial of service attack; a change in the topology or layout used in the deployment of an application; information, such as a breach into a digital certificate provider, that may alter the security characteristics of an application; and/or any other activity, function, occurrence, or event, associated with, caused by, or imposed upon, one or more log data sources.

In one embodiment, once the trigger events of interest are defined at DEFINE TRIGGER EVENT LOG ENTRY DATA OPERATION 307, trigger event log entry data is defined at DEFINE TRIGGER EVENT LOG ENTRY DATA OPERATION 307 which represents log entry data that would be expected to appear in the second log data generated by the second log data source of OBTAIN ACCESS TO SECOND LOG DATA FROM A SECOND LOG DATA SOURCE OPERATION 305 if the trigger event of DEFINE TRIGGER EVENT LOG ENTRY DATA OPERATION 307 were to occur. In short, data indicating a log entry in the second log data of the second log data source associated with the defined trigger event is defined and recorded at DEFINE TRIGGER EVENT LOG ENTRY DATA OPERATION 307.

In one embodiment, once data indicating a log entry in the second log data of the second log data source associated with the defined trigger event is defined and recorded at DEFINE TRIGGER EVENT LOG ENTRY DATA OPERATION 307, process flow proceeds to MONITOR THE SECOND LOG DATA FROM THE SECOND LOG DATA SOURCE OPERATION 309.

In one embodiment, once the defined trigger event log entry data associated with the defined trigger event is defined at DEFINE TRIGGER EVENT LOG ENTRY DATA OPERATION 307, the second log data generated by the second log data source of OBTAIN ACCESS TO SECOND LOG DATA FROM A SECOND LOG DATA SOURCE OPERATION 305 is monitored, e.g., read or scanned, at MONITOR THE SECOND LOG DATA FROM THE SECOND LOG DATA SOURCE OPERATION 309 to identify a log data entry in the second log data of the second log data source of OBTAIN ACCESS TO SECOND LOG DATA FROM A SECOND LOG DATA SOURCE OPERATION 305 matching the defined trigger event log data entry data of DEFINE TRIGGER EVENT LOG ENTRY DATA OPERATION 307.

In one embodiment, once the second log data generated by the second log data source of OBTAIN ACCESS TO SECOND LOG DATA FROM A SECOND LOG DATA SOURCE OPERATION 305 is being monitored at MONITOR THE SECOND LOG DATA FROM THE SECOND LOG DATA SOURCE OPERATION 309 to identify a log data entry in the second log data of the second log data source of OBTAIN ACCESS TO SECOND LOG DATA FROM A SECOND LOG DATA SOURCE OPERATION 305 matching the defined trigger event log data entry data of DEFINE TRIGGER EVENT LOG ENTRY DATA OPERATION 307, process flow proceeds to DETECT THE TRIGGER EVENT LOG ENTRY DATA IN THE SECOND LOG DATA FROM THE SECOND LOG DATA SOURCE OPERATION 311.

In one embodiment, at DETECT THE TRIGGER EVENT LOG ENTRY DATA IN THE SECOND LOG DATA FROM THE SECOND LOG DATA SOURCE OPERATION 311 a log data entry in the second log data of the second log data source of OBTAIN ACCESS TO SECOND LOG DATA FROM A SECOND LOG DATA SOURCE OPERATION 305 matching the defined trigger event log data entry data of DEFINE TRIGGER EVENT LOG ENTRY DATA OPERATION 307 is detected.

In one embodiment, once a log data entry in the second log data of the second log data source of OBTAIN ACCESS TO SECOND LOG DATA FROM A SECOND LOG DATA SOURCE OPERATION 305 matching the defined trigger event log data entry data of DEFINE TRIGGER EVENT LOG ENTRY DATA OPERATION 307 is detected at DETECT THE TRIGGER EVENT LOG ENTRY DATA IN THE SECOND LOG DATA FROM THE SECOND LOG DATA SOURCE OPERATION 311, process flow proceeds to CORRELATE THE DETECTED TRIGGER EVENT LOG ENTRY DATA IN THE SECOND LOG DATA FROM THE SECOND LOG DATA SOURCE WITH THE FIRST LOG DATA FROM THE FIRST LOG DATA SOURCE OPERATION 313.

In one embodiment, at CORRELATE THE DETECTED TRIGGER EVENT LOG ENTRY DATA IN THE SECOND LOG DATA FROM THE SECOND LOG DATA SOURCE WITH THE FIRST LOG DATA FROM THE FIRST LOG DATA SOURCE OPERATION 313 one or more correlation actions are taken to indicate a connection between the detected matching log data entry of DETECT THE TRIGGER EVENT LOG ENTRY DATA IN THE SECOND LOG DATA FROM THE SECOND LOG DATA SOURCE OPERATION 311 in the second log data of OBTAIN ACCESS TO SECOND LOG DATA FROM A SECOND LOG DATA SOURCE OPERATION 305 and the first log data of the first log data source of OBTAIN ACCESS TO FIRST LOG DATA FROM A FIRST LOG DATA SOURCE OPERATION 303.

In one embodiment, if a log data entry in the second log data of the second log data source matching the defined trigger event log data entry data is detected at DETECT THE TRIGGER EVENT LOG ENTRY DATA IN THE SECOND LOG DATA FROM THE SECOND LOG DATA SOURCE OPERATION 311, the correlation action taken at CORRELATE THE DETECTED TRIGGER EVENT LOG ENTRY DATA IN THE SECOND LOG DATA FROM THE SECOND LOG DATA SOURCE WITH THE FIRST LOG DATA FROM THE FIRST LOG DATA SOURCE OPERATION 313 includes inserting linking data into the first log data stream of the first log data source of OBTAIN ACCESS TO FIRST LOG DATA FROM A FIRST LOG DATA SOURCE OPERATION 303 indicating that the first log data should be read with, or in light of, the detected trigger event log entry data of the second log data from the second log data source of DETECT THE TRIGGER EVENT LOG ENTRY DATA IN THE SECOND LOG DATA FROM THE SECOND LOG DATA SOURCE OPERATION 311, and/or a portion of, or the entirety of, the second log data from the second log data source of OBTAIN ACCESS TO SECOND LOG DATA FROM A SECOND LOG DATA SOURCE OPERATION 305.

In this way, the first log data from the first log data source and the second log data from the second log data source are connected so that the first log data from the first log data source can be interpreted using at least the part of the second log data from the second log data source indicating the defined trigger event of DEFINE TRIGGER EVENT LOG ENTRY DATA OPERATION 307 took place.

Figure 2A:
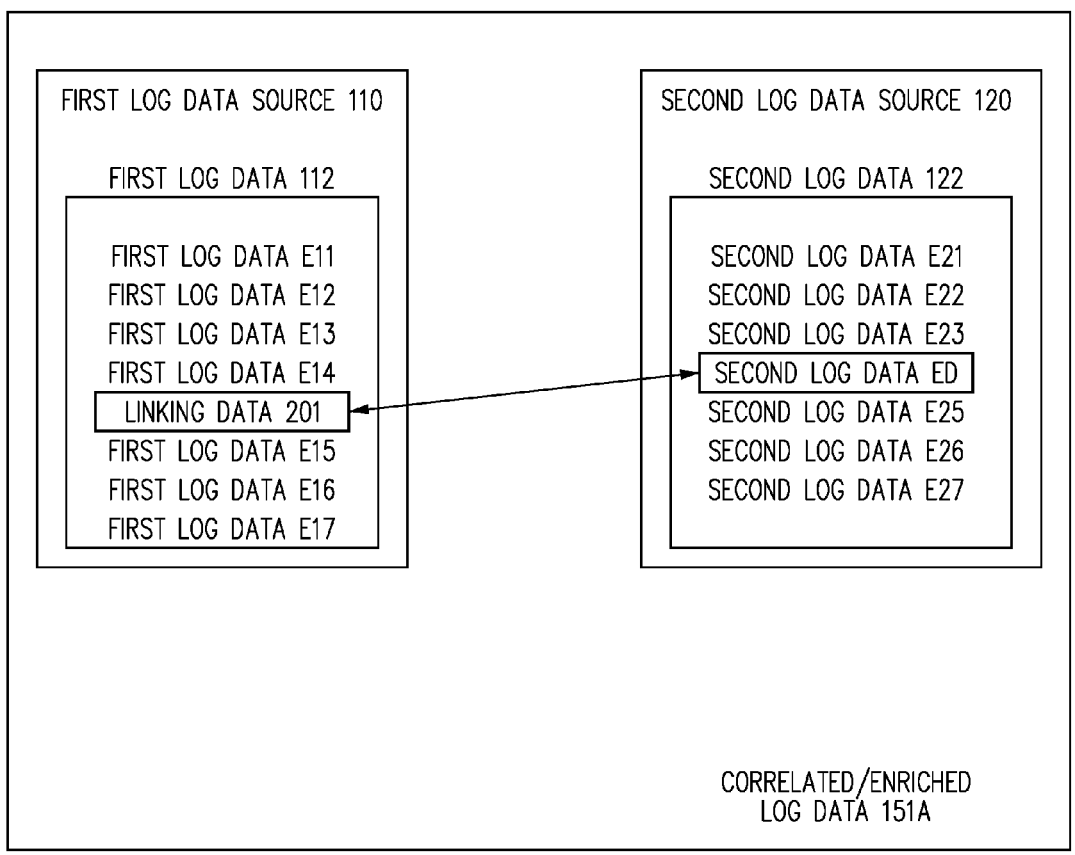
FIG. 2A shows correlated/enriched log data generated by a correlation/enrichment action implementation module, in accordance with one illustrative example of one embodiment.

FIG. 2A shows correlated/enriched log data 151A, such as a specific example of correlated/enriched log data 151 of FIG. 1, generated by a correlation/enrichment action implementation module, such as correlation/enrichment action implementation module 150 of FIG. 1, in accordance with one illustrative example of one embodiment.

As seen in FIG. 2A, and as discussed above with respect to FIG. 1, first log data source 110 includes first log data 112, including first log data entry E11, first log data entry E12, first log data entry E13, first log data entry E14, first log data entry E15, first log data entry E16, and first log data entry E17. In various embodiments, each of the first log data entries E11 through E17 represents a log data entry associated with an operation or event directly affecting first log data source 110.

Likewise, as also seen in FIG. 1, second log data source 120 includes second log data 122, including second log data entry E21, second log data entry E22, second log data entry E23, second log data entry ED, second log data entry E25, second log data entry E26, and second log data entry E27. In various embodiments, each of the second log data entries E21 through E27 represents a log data entry associated with an operation or event directly affecting second log data source 120.

Referring now to FIG. 2A and FIG. 3 together, in response to a detected log data entry, i.e., second log data ED, in second log data 122 of the second log data source 120, that matches the defined trigger event log data entry data, at DETECT THE TRIGGER EVENT LOG ENTRY DATA IN THE SECOND LOG DATA FROM THE SECOND LOG DATA SOURCE OPERATION 311, linking data 201 is inserted into first log data 112 of the first log data source 110 of OBTAIN ACCESS TO FIRST LOG DATA FROM A FIRST LOG DATA SOURCE OPERATION 303 indicating that first log data 112 should be read with, or in light of, the detected trigger event log entry data, i.e., second log data ED, of second log data 122 from second log data source 120 of DETECT THE TRIGGER EVENT LOG ENTRY DATA IN THE SECOND LOG DATA FROM THE SECOND LOG DATA SOURCE OPERATION 311, and/or a portion of, or the entirety of, second log data 122 from second log data source 120 of OBTAIN ACCESS TO SECOND LOG DATA FROM A SECOND LOG DATA SOURCE OPERATION 305.

Returning to FIG. 3, in various embodiments, the linking data is inserted into the first log data from the first log data source manually, e.g., via a human interface and human interaction; or semi-automatically, e.g., subject to review and/or approval; or automatically, e.g., without subsequent review or approval.

In one embodiment, if a log data entry in the second log data of the second log data source matching the defined trigger event log data entry data is detected at DETECT THE TRIGGER EVENT LOG ENTRY DATA IN THE SECOND LOG DATA FROM THE SECOND LOG DATA SOURCE OPERATION 311, the correlation action taken at CORRELATE THE DETECTED TRIGGER EVENT LOG ENTRY DATA IN THE SECOND LOG DATA FROM THE SECOND LOG DATA SOURCE WITH THE FIRST LOG DATA FROM THE FIRST LOG DATA SOURCE OPERATION 313 includes generating correlated/enriched log data in a separate log data stream including the detected trigger event log entry data of DETECT THE TRIGGER EVENT LOG ENTRY DATA IN THE SECOND LOG DATA FROM THE SECOND LOG DATA SOURCE OPERATION 311 from the second log data of MONITOR THE SECOND LOG DATA FROM THE SECOND LOG DATA SOURCE OPERATION 309, and/or a portion of, or the entirety of, the second log data from the second log data source OBTAIN ACCESS TO SECOND LOG DATA FROM A SECOND LOG DATA SOURCE OPERATION 305.

In this embodiment, the first log data from the first log data source of OBTAIN ACCESS TO FIRST LOG DATA FROM A FIRST LOG DATA SOURCE OPERATION 303 and the correlated/enriched log data in the separate log data stream, including the detected trigger event log entry data of the second log data from the second log data source, are connected so that the first log data from the first log data source of OBTAIN ACCESS TO FIRST LOG DATA FROM A FIRST LOG DATA SOURCE OPERATION 303 can be interpreted using at least the part of the second log data from the second log data source of OBTAIN ACCESS TO SECOND LOG DATA FROM A SECOND LOG DATA SOURCE OPERATION 305 indicating the defined trigger event of DEFINE TRIGGER EVENT LOG ENTRY DATA OPERATION 307 took place.

Figure 2B:
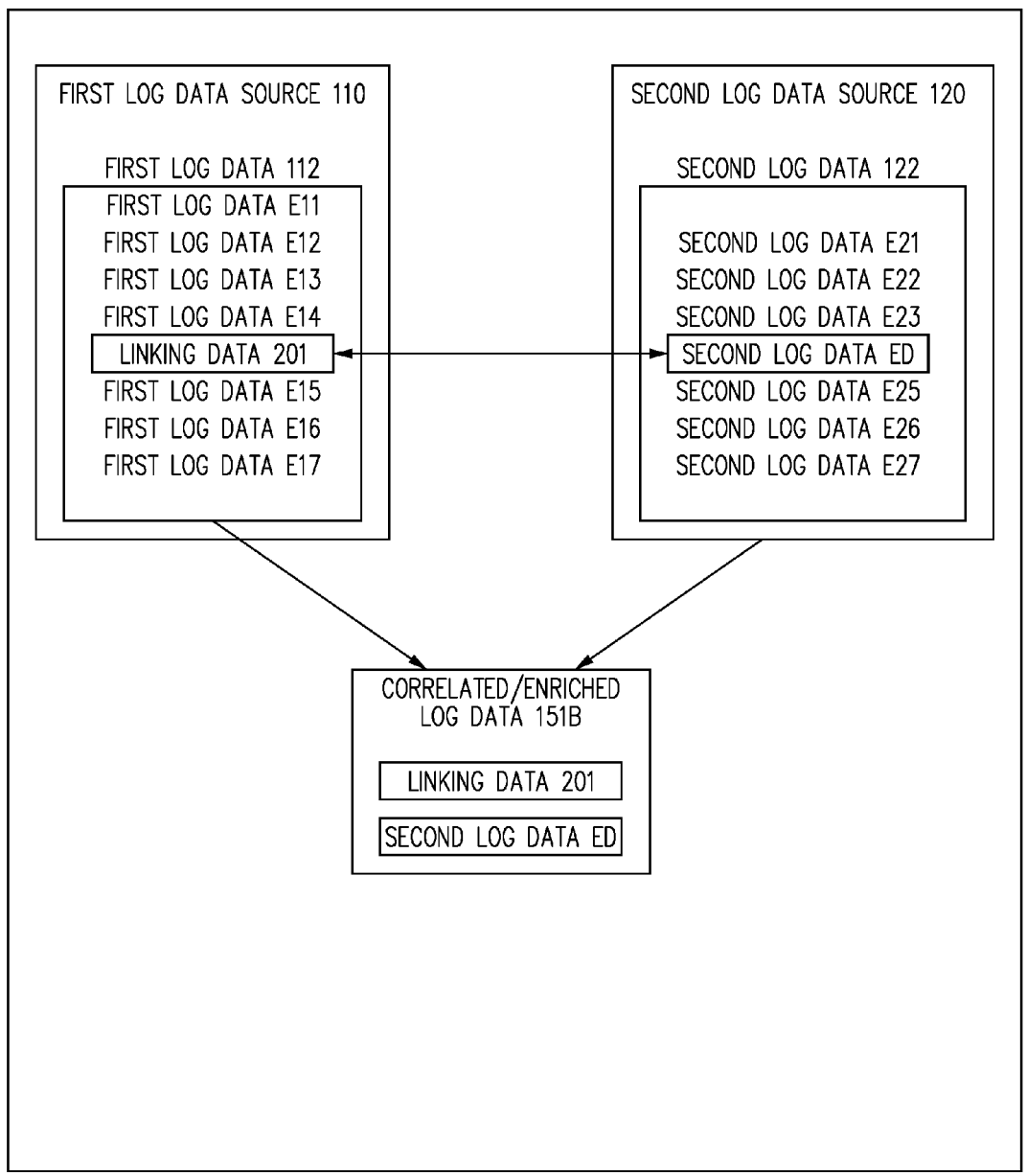
FIG. 2B shows correlated/enriched log data generated by a correlation/enrichment action implementation module in accordance with one illustrative example of one embodiment.

FIG. 2B shows correlated/enriched log data 151B, such as a specific example of correlated/enriched log data 151 of FIG. 1, generated by a correlation/enrichment action implementation module, such as correlation/enrichment action implementation module 150 of FIG. 1, in accordance with one illustrative example of one embodiment.

As seen in FIG. 2B, and as discussed above with respect to FIG. 1, first log data source 110 includes first log data 112, including first log data entry E11, first log data entry E12, first log data entry E13, first log data entry E14, first log data entry E15, first log data entry E16, and first log data entry E17. In various embodiments, each of the first log data entries E11 through E17 represents a log data entry associated with an operation or event directly affecting first log data source 110.

Likewise, as also seen in FIG. 1, second log data source 120 includes second log data 122, including second log data entry E21, second log data entry E22, second log data entry E23, second log data entry ED, second log data entry E25, second log data entry E26, and second log data entry E27. In various embodiments, each of the second log data entries E21 through E27 represents a log data entry associated with an operation or event directly affecting second log data source 120.

Referring now to FIG. 2B and FIG. 3 together, in response to a detected log data entry, i.e., second log data ED, in second log data 122 of the second log data source 120 that matches the defined trigger event log data entry data, at DETECT THE TRIGGER EVENT LOG ENTRY DATA IN THE SECOND LOG DATA FROM THE SECOND LOG DATA SOURCE OPERATION 311, linking data 201 and second log data ED are included in a third log data stream of correlated/enriched log data 151B so that first log data 112 can be read with, or in light of, the detected trigger event log entry data, i.e., second log data ED, of second log data 122 from second log data source 120 of DETECT THE TRIGGER EVENT LOG ENTRY DATA IN THE SECOND LOG DATA FROM THE SECOND LOG DATA SOURCE OPERATION 311, and/or a portion of, or the entirety of, second log data 122 from second log data source 120 of OBTAIN ACCESS TO SECOND LOG DATA FROM A SECOND LOG DATA SOURCE OPERATION 305.

Returning to FIG. 3, in various embodiments, the correlated/enriched log data is generated in the separate log data stream manually, e.g., via a human interface and human interaction; or semi-automatically, e.g., subject to review and/or approval; or automatically, e.g., without subsequent review or approval.

Returning to the illustrative example presented above, recall a service provided through a cloud computing environment employs multiple virtual machine instances and the virtual machine instances are accessed via the Internet using variable sets of IP addresses assigned to the service by a cloud computing environment provider hosting the service. In this case, each of the virtual machine instances is a first log data source and would typically maintain its own internal first log data recording various log entries related to the events associated with that virtual machine instance, i.e., each virtual machine instance would be a first source of log data associated with that virtual machine instance.

In addition, in this specific illustrative example, the cloud computing environment provider would also maintain log data recording events associated with the cloud infrastructure, i.e., the cloud computing environment provider would be a second log data source maintaining second log data associated with the cloud infrastructure.

Recall that for the purposes of illustration, one or more of the IP addresses assigned to the service by the cloud computing environment provider are stipulated to have been cancelled/destroyed by the cloud computing environment provider. In this case, the second log entry data associated with the cloud infrastructure would include log entry data indicating the event of the one or more IP addresses being cancelled.

In addition, the first log data for each of the virtual machine instances using the cancelled IP addresses would undoubtedly also include log entry data indicating that these resources dropped offline once the IP addresses were destroyed.

Using prior systems, the first log data for each of the virtual machine instances would not be correlated with the second log data associated with the cloud infrastructure. Consequently, considerable time and energy could be expended to "discover" that the IP addresses associated with the virtual machine instances we destroyed at the infrastructure level and that this event was the cause of these virtual machine instances dropping offline. However, using process 300 for creating enriched log data, the second log entry data associated with the cloud infrastructure indicating the destruction of the IP addresses is correlated with the first log entry data from the virtual machine instances indicating the instances dropped offline. Consequently, using process 300 for creating enriched log data it is immediately apparent why the virtual machine instances dropped offline.

In one embodiment, once one or more correlation actions are taken to indicate a connection between the detected matching log data entry of DETECT THE TRIGGER EVENT LOG ENTRY DATA IN THE SECOND LOG DATA FROM THE SECOND LOG DATA SOURCE OPERATION 311 in the second log data of OBTAIN ACCESS TO SECOND LOG DATA FROM A SECOND LOG DATA SOURCE OPERATION 305 and the first log data of the first log data source of OBTAIN ACCESS TO FIRST LOG DATA FROM A FIRST LOG DATA SOURCE OPERATION 303 at CORRELATE THE DETECTED TRIGGER EVENT LOG ENTRY DATA IN THE SECOND LOG DATA FROM THE SECOND LOG DATA SOURCE WITH THE FIRST LOG DATA FROM THE FIRST LOG DATA SOURCE OPERATION 313, process flow proceeds to EXIT OPERATION 330.

In one embodiment, at EXIT OPERATION 330 process 300 for creating enriched log data is exited to await new data.

Using process 300 for creating enriched log data discussed above, log data from two or more log data sources can be effectively and efficiently correlated to connect events, and the consequences of those events, on multiple components, assets, and/or resources implemented in different portions of a given computing environment, such as a cloud computing environment, and/or in different computing environments. Consequently, using process 300 for creating enriched log data, cause-and-effect relationships within one or more computing environments are automatically identified without the need to devote significant time and resources.

In accordance with one embodiment, a process for creating enriched log data includes obtaining access to first log data from a first log data source. In one embodiment, access to second log data from a second log data source is also obtained. In one embodiment, the second log data source is distinct from the first log data source such that the second log data is external log data with respect to the first log data.

In one embodiment, a trigger event is defined and trigger event log entry data indicating the trigger event has occurred is defined. In one embodiment, the second log data from the second log data source is monitored to detect the defined trigger event log entry data in the second log data from the second log data source. In one embodiment, if the defined trigger event log entry data in the second log data from the second log data source is detected, at least part of the second log data from the second log data source is inserted into the first log data of the first log data source.

Figure 4:
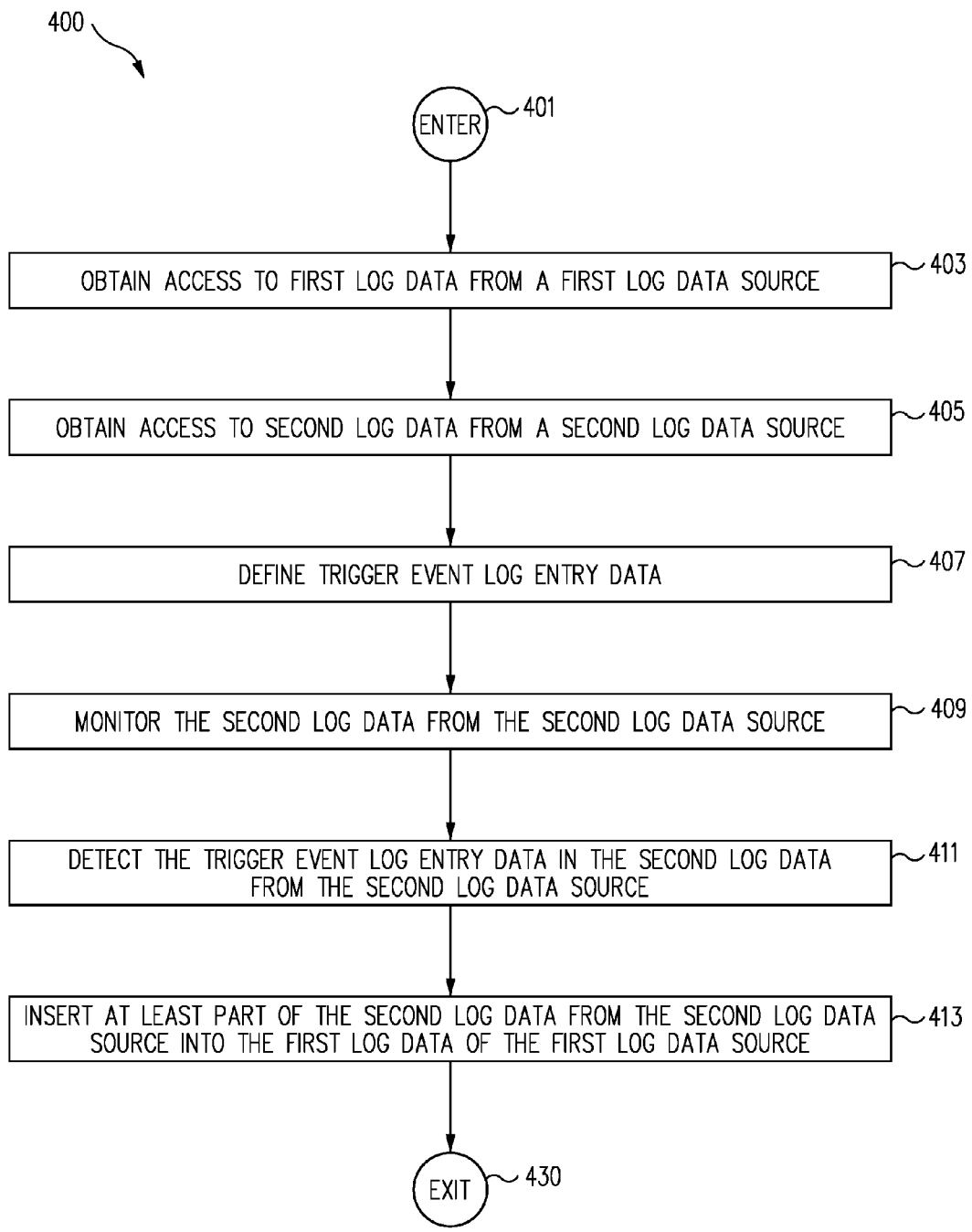
FIG. 4 is a flow chart depicting a process for creating enriched log data in accordance with one embodiment.

FIG. 4 is a flow chart of a process 400 for creating enriched log data in accordance with one embodiment. In one embodiment, process 400 for creating enriched log data begins at ENTER OPERATION 401 of FIG. 4 and process flow proceeds to OBTAIN ACCESS TO FIRST LOG DATA FROM A FIRST LOG DATA SOURCE OPERATION 403.

In one embodiment, at OBTAIN ACCESS TO FIRST LOG DATA FROM A FIRST LOG DATA SOURCE OPERATION 403 access to first log data from a first log data source is obtained.

In various embodiments, the first log data source of OBTAIN ACCESS TO FIRST LOG DATA FROM A FIRST LOG DATA SOURCE OPERATION 403 is a log data source for which it is desired to provide enriched log data correlating, and/or supplementing, the first log data associated with, and generated by, the first log data source.

In various embodiments, there can be multiple first log data sources, i.e., log data sources for which it is desired to provide enriched log data at OBTAIN ACCESS TO FIRST LOG DATA FROM A FIRST LOG DATA SOURCE OPERATION 403.

In one embodiment, once access to first log data from a first log data source is obtained at OBTAIN ACCESS TO FIRST LOG DATA FROM A FIRST LOG DATA SOURCE OPERATION 403, process flow proceeds to OBTAIN ACCESS TO SECOND LOG DATA FROM A SECOND LOG DATA SOURCE OPERATION 405.

In one embodiment, at OBTAIN ACCESS TO SECOND LOG DATA FROM A SECOND LOG DATA SOURCE OPERATION 405 access to second log data from a second log data source is obtained.

In accordance with one embodiment, and as discussed below, the second log data source of OBTAIN ACCESS TO SECOND LOG DATA FROM A SECOND LOG DATA SOURCE OPERATION 405 is a log data source from which it is desired to obtain log enrichment data correlating, and/or supplementing, the first log data associated with, and generated by, the first log data source of OBTAIN ACCESS TO FIRST LOG DATA FROM A FIRST LOG DATA SOURCE OPERATION 403. In various embodiments, there can be multiple second log data sources, i.e. log data sources from which it is desired to obtain log enrichment data at OBTAIN ACCESS TO SECOND LOG DATA FROM A SECOND LOG DATA SOURCE OPERATION 405.

In one embodiment, the term "log data source" as used in connection with OBTAIN ACCESS TO FIRST LOG DATA FROM A FIRST LOG DATA SOURCE OPERATION 403 and OBTAIN ACCESS TO SECOND LOG DATA FROM A SECOND LOG DATA SOURCE OPERATION 405 includes, but is not limited to, any virtual or non-virtual source of log data including, but not limited to, a cloud computing infrastructure, and/or cloud computing infrastructure provider; a service provided through cloud computing environment, and/or a service provider; an application provided through cloud computing environment, and/or an application provider; and/or any virtual or non-virtual asset operating within, or associated with, and or utilized by, one or more resources operating within, or associated with, one or more computing environments, such as a cloud computing environment.

As used herein, the term "virtual asset" includes any virtualized entity or resource, and/or a software subsystem of an actual, or "bare metal" entity. In various embodiments, virtual assets can be, but are not limited to, virtual machines, virtual servers and instances implemented in a cloud computing environment; administrative and/or data store instances implemented, or associated with, a cloud computing environment; service related instances associated with, and or delivered through, a cloud computing environment; and/or any other virtualized assets and/or sub-systems of "bare metal" physical devices, as discussed herein, and/or as known/available in the art at the time of filing, and/or as developed/made available after the time of filing.

As an even more specific example, in various embodiments, the log data sources can include, but are not limited to, a virtual machine instance; a virtual server instance; a virtual data store instance; a database or data store; any instance in a cloud computing environment; a cloud computing environment access system; part of a mobile device; part of a remote sensor; part of a laptop computing system; part of a desktop computing system; part of a point-of-sale computing system; and part of an ATM; a server computing system; a workstation; a storage cluster; a switching system; a router; any hardware system; any communications system; any form of proxy system; a gateway system; a firewall system; a load balancing system; a bastion host; an application; an account; an external accessibility monitoring service; an enterprise; a service; a database or data store; a computing environment access system; an external operational monitoring service; a mobile device; a remote sensor; a laptop computing system; a desktop computing system; a point-of-sale computing system; an ATM; or any other virtual or non-virtual asset as discussed herein, and/or as known in the art at the time of filing, and/or as becomes known after the time of filing.

In one embodiment, the log data sources are virtual assets instantiated in one or more computing environments using a virtual asset creation system such as a virtual asset creation template through which the creator of the log data source can generate log data source creation data.

In various embodiments, each of the log data sources of OBTAIN ACCESS TO FIRST LOG DATA FROM A FIRST LOG DATA SOURCE OPERATION 403 and OBTAIN ACCESS TO SECOND LOG DATA FROM A SECOND LOG DATA SOURCE OPERATION 405 includes the capability of recording log entry data, also referred to herein as log data entries. In various embodiments, the log data entries indicate various operations, functions, occurrences, and events related to each individual log data source. Specific illustrative examples of log entry data include data indicating one or more of, performance metrics; peer communication and peer communication attempts; user interaction and log data source availability; failed access attempts; successful access attempts; account creation; the setting of security requirements, such as multiple factor authentication requirements; the removal or addition of security requirements; the creation or changing of access control lists; and/or any other activity, function, occurrence, or event, associated with, caused by, or imposed upon, the log data sources. As noted above, currently, the log data entries associated with a given log data source are typically recorded and maintained in isolation from the other log data sources operating within the same computing environment, such as a cloud computing environment, and in many cases those within the same application or service.

In one embodiment, once access to second log data from a second log data source is obtained at OBTAIN ACCESS TO SECOND LOG DATA FROM A SECOND LOG DATA SOURCE OPERATION 405, process flow proceeds to DEFINE TRIGGER EVENT LOG ENTRY DATA OPERATION 407.

As noted above, currently, the various log data sources operating within a cloud computing environment, and or associated with a cloud computing environment, of OBTAIN ACCESS TO FIRST LOG DATA FROM A FIRST LOG DATA SOURCE OPERATION 403 and OBTAIN ACCESS TO SECOND LOG DATA FROM A SECOND LOG DATA SOURCE OPERATION 405 maintain log data including log entry data indicating the occurrence of various events associated with the individual log data sources.

As also noted above, currently, the various log data sources of OBTAIN ACCESS TO FIRST LOG DATA FROM A FIRST LOG DATA SOURCE OPERATION 403 and OBTAIN ACCESS TO SECOND LOG DATA FROM A SECOND LOG DATA SOURCE OPERATION 405 operate and maintain their respective log entry data in virtual isolation from other log data sources operating within, and/or associated with, the same cloud computing environment.

As also noted above, this fact contributes to the prior art inability to correlate various events affecting log data sources operating in the same cloud computing environment, or even those within the same application or service. As a result, currently, significant amounts of time and energy are devoted to manually performing forensic analysis to determine that various events occurring within the cloud computing environment, or a common application or service, are connected in a cause-and-effect relationship. In short, currently, there is no effective and efficient mechanism for correlating log entry data of two or more log data sources that are, in fact, connected by a common event.

To address this issue, in one embodiment, at DEFINE TRIGGER EVENT LOG ENTRY DATA OPERATION 407 one or more trigger events are defined. In various embodiments, the trigger events defined at DEFINE TRIGGER EVENT LOG ENTRY DATA OPERATION 407 are those events that are likely to have an effect on one or more log data sources of OBTAIN ACCESS TO FIRST LOG DATA FROM A FIRST LOG DATA SOURCE OPERATION 403, i.e., are likely to have a cause-and-effect relationship with one or more log data sources of OBTAIN ACCESS TO FIRST LOG DATA FROM A FIRST LOG DATA SOURCE OPERATION 403 in a cloud computing environment. In various embodiments, the trigger events can be from outside an application, relevant to the application, yet independent of the application such as, but not limited to, the deletion of a user account or an "Internet network storm" that could impact the performance.

In various embodiments, at DEFINE TRIGGER EVENT LOG ENTRY DATA OPERATION 407 a given use case associated with a first log data source of OBTAIN ACCESS TO FIRST LOG DATA FROM A FIRST LOG DATA SOURCE OPERATION 403 is identified, such as a service or application utilizing the log data source.

In one embodiment, the defined use case is used at DEFINE TRIGGER EVENT LOG ENTRY DATA OPERATION 407 to determine what other log data sources, such as a second log data source of OBTAIN ACCESS TO SECOND LOG DATA FROM A SECOND LOG DATA SOURCE OPERATION 405, will be used to obtain enrichment, or supplementary, second log data to be correlated, and/or added to, the first log data of the first log data source of OBTAIN ACCESS TO FIRST LOG DATA FROM A FIRST LOG DATA SOURCE OPERATION 403. In addition, at DEFINE TRIGGER EVENT LOG ENTRY DATA OPERATION 407 the identified use case associated with the first log data source is used to determine the trigger events of interest associated with the second log data source, and that would be recorded in the second log data of the second log data source of OBTAIN ACCESS TO SECOND LOG DATA FROM A SECOND LOG DATA SOURCE OPERATION 405.

As specific illustrative examples, in various embodiments, trigger events of DEFINE TRIGGER EVENT LOG ENTRY DATA OPERATION 407 can be, but are not limited to, one or more of, account creation events; the setting of security requirements, such as multiple factor authentication requirements; the removal or addition of security requirements; the creation or changing of access control lists; the creation and or removal of communications channels; performance metrics analysis or results; peer communications and peer communication attempts; user interaction and log data source availability events; failed access attempts; successful access attempts; the abnormal termination of an application; the increase of error rates in response to customer requests; the detection that an Internet networking event that may impact performance is happening; the alerting by a third party of a denial of service attack; a change in the topology or layout used in the deployment of an application; information, such as a breach into a digital certificate provider, that may alter the security characteristics of an application; and/or any other activity, function, occurrence, or event, associated with, caused by, or imposed upon, one or more log data sources.

In one embodiment, once the trigger events of interest are defined at DEFINE TRIGGER EVENT LOG ENTRY DATA OPERATION 407, trigger event log entry data is defined at DEFINE TRIGGER EVENT LOG ENTRY DATA OPERATION 407 which represents log entry data that would be expected to appear in the second log data generated by the second log data source of OBTAIN ACCESS TO SECOND LOG DATA FROM A SECOND LOG DATA SOURCE OPERATION 405 if the trigger event of DEFINE TRIGGER EVENT LOG ENTRY DATA OPERATION 407 were to occur. In short, data indicating a log entry in the second log data of the second log data source associated with the defined trigger event is defined and recorded at DEFINE TRIGGER EVENT LOG ENTRY DATA OPERATION 407.

In one embodiment, once data indicating a log entry in the second log data of the second log data source associated with the defined trigger event is defined and recorded at DEFINE TRIGGER EVENT LOG ENTRY DATA OPERATION 407, process flow proceeds to MONITOR THE SECOND LOG DATA FROM THE SECOND LOG DATA SOURCE OPERATION 409.

In one embodiment, once the defined trigger event log entry data associated with the defined trigger event is defined at DEFINE TRIGGER EVENT LOG ENTRY DATA OPERATION 407, the second log data generated by the second log data source of OBTAIN ACCESS TO SECOND LOG DATA FROM A SECOND LOG DATA SOURCE OPERATION 405 is monitored, e.g., read or scanned, at MONITOR THE SECOND LOG DATA FROM THE SECOND LOG DATA SOURCE OPERATION 409 to identify a log data entry in the second log data of the second log data source of OBTAIN ACCESS TO SECOND LOG DATA FROM A SECOND LOG DATA SOURCE OPERATION 405 matching the defined trigger event log data entry data of DEFINE TRIGGER EVENT LOG ENTRY DATA OPERATION 407.

In one embodiment, once the second log data generated by the second log data source of OBTAIN ACCESS TO SECOND LOG DATA FROM A SECOND LOG DATA SOURCE OPERATION 405 is being monitored at MONITOR THE SECOND LOG DATA FROM THE SECOND LOG DATA SOURCE OPERATION 409 to identify a log data entry in the second log data of the second log data source of OBTAIN ACCESS TO SECOND LOG DATA FROM A SECOND LOG DATA SOURCE OPERATION 405 matching the defined trigger event log data entry data of DEFINE TRIGGER EVENT LOG ENTRY DATA OPERATION 407, process flow proceeds to DETECT THE TRIGGER EVENT LOG ENTRY DATA IN THE SECOND LOG DATA FROM THE SECOND LOG DATA SOURCE OPERATION 411.

In one embodiment, at DETECT THE TRIGGER EVENT LOG ENTRY DATA IN THE SECOND LOG DATA FROM THE SECOND LOG DATA SOURCE OPERATION 411 a log data entry in the second log data of the second log data source of OBTAIN ACCESS TO SECOND LOG DATA FROM A SECOND LOG DATA SOURCE OPERATION 405 matching the defined trigger event log data entry data of DEFINE TRIGGER EVENT LOG ENTRY DATA OPERATION 407 is detected.

In one embodiment, once a log data entry in the second log data of the second log data source of OBTAIN ACCESS TO SECOND LOG DATA FROM A SECOND LOG DATA SOURCE OPERATION 405 matching the defined trigger event log data entry data of DEFINE TRIGGER EVENT LOG ENTRY DATA OPERATION 407 is detected at DETECT THE TRIGGER EVENT LOG ENTRY DATA IN THE SECOND LOG DATA FROM THE SECOND LOG DATA SOURCE OPERATION 411, process flow proceeds to INSERT AT LEAST PART OF THE SECOND LOG DATA FROM THE SECOND LOG DATA SOURCE INTO THE FIRST LOG DATA OF THE FIRST LOG DATA SOURCE OPERATION 413.

In one embodiment, at INSERT AT LEAST PART OF THE SECOND LOG DATA FROM THE SECOND LOG DATA SOURCE INTO THE FIRST LOG DATA OF THE FIRST LOG DATA SOURCE OPERATION 413, one or more supplementation/enrichment actions are taken to add data indicating a connection between the detected matching log data entry in the second log data and the first log data of the first log data source.

In one embodiment, the supplementation/enrichment action taken at INSERT AT LEAST PART OF THE SECOND LOG DATA FROM THE SECOND LOG DATA SOURCE INTO THE FIRST LOG DATA OF THE FIRST LOG DATA SOURCE OPERATION 413 to add data indicating a connection between the detected matching log data entry in the second log data and the first log data of the first log data source includes inserting at least a relevant portion of the second log data of the second log data source of OBTAIN ACCESS TO SECOND LOG DATA FROM A SECOND LOG DATA SOURCE OPERATION 405 directly into the first log data of the first log data source of OBTAIN ACCESS TO FIRST LOG DATA FROM A FIRST LOG DATA SOURCE OPERATION 403.

In one embodiment, the relevant portion of the second log data inserted into the first log data at INSERT AT LEAST PART OF THE SECOND LOG DATA FROM THE SECOND LOG DATA SOURCE INTO THE FIRST LOG DATA OF THE FIRST LOG DATA SOURCE OPERATION 413 includes, but is not limited to, the log data entry in the second log data of the second log data source matching the defined trigger event log data entry data of DETECT THE TRIGGER EVENT LOG ENTRY DATA IN THE SECOND LOG DATA FROM THE SECOND LOG DATA SOURCE OPERATION 411.

In this embodiment, the first log data from the first log data source of OBTAIN ACCESS TO FIRST LOG DATA FROM A FIRST LOG DATA SOURCE OPERATION 403 is directly supplemented and enriched using the relevant portion of the second log data from the second log data source of OBTAIN ACCESS TO SECOND LOG DATA FROM A SECOND LOG DATA SOURCE OPERATION 405 indicating that the defined trigger event of DEFINE TRIGGER EVENT LOG ENTRY DATA OPERATION 407 has occurred. Consequently, any review of the first log data from the first log data source directly indicates the occurrence of the defined trigger event so that the original log data entries in the first log data can be interpreted in light of the occurrence of the defined trigger event.

As noted above, in various embodiments, the insertion of the relevant portion of the second log data from the second log data source into the first log data of the first log data source is accomplished at INSERT AT LEAST PART OF THE SECOND LOG DATA FROM THE SECOND LOG DATA SOURCE INTO THE FIRST LOG DATA OF THE FIRST LOG DATA SOURCE OPERATION 413 using a log enrichment API through which a user, such as an application or service provider, can specifically request insertion of relevant second log data.

Figure 2C:
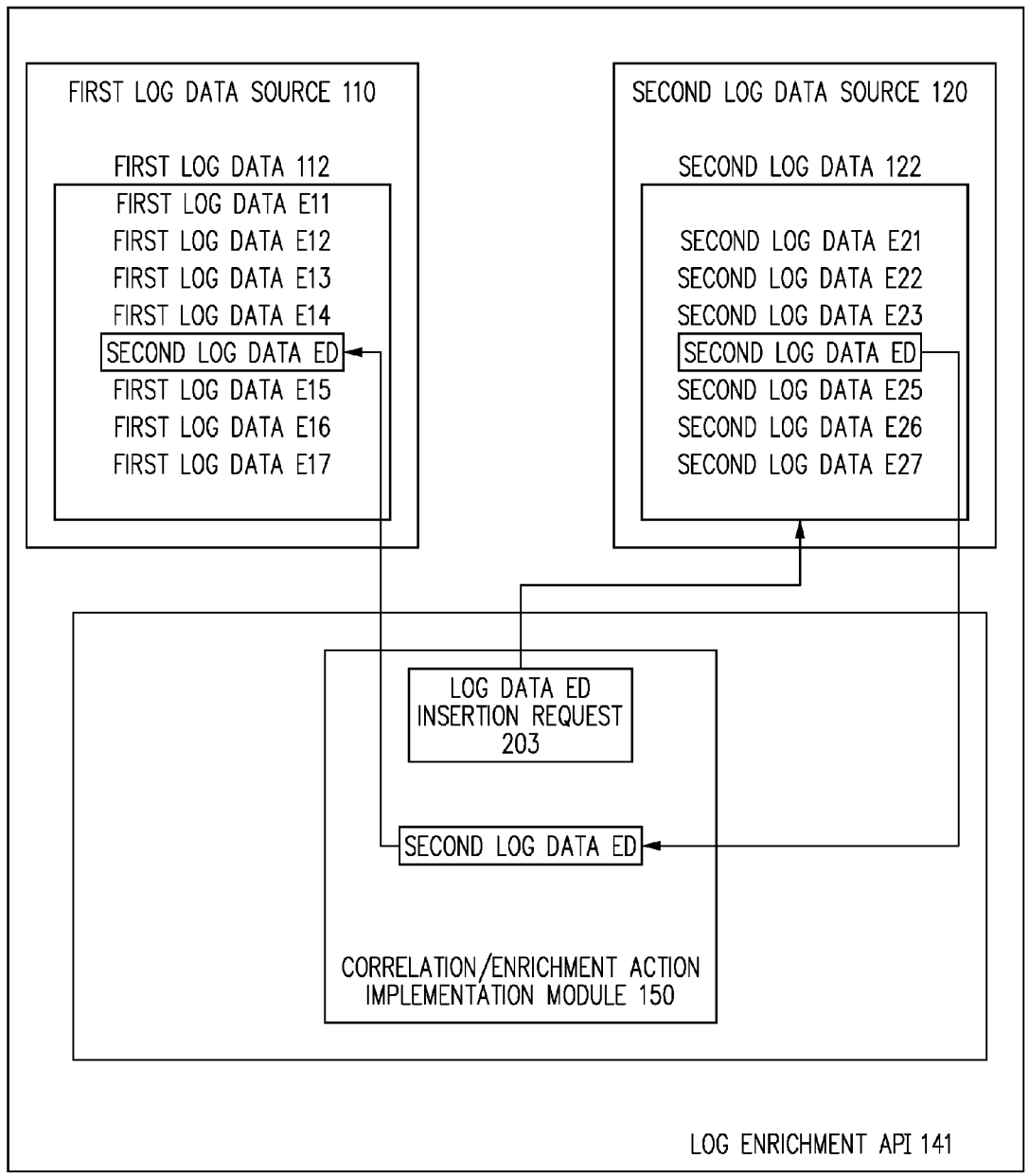
FIG. 2C shows the insertion of a relevant portion of second log data from a second log data source into the first log data of a first log data source in accordance with one illustrative example of one embodiment.

FIG. 2C shows, the insertion of the relevant portion of second log data 122, i.e., second log data ED, from second log data source 120 into the first log data 112 of first log data source 110 in accordance with one illustrative example of one embodiment.

As seen in FIG. 2C, and as discussed above with respect to FIG. 1, first log data source 110 includes first log data 112, including first log data entry E11, first log data entry E12, first log data entry E13, first log data entry E14, first log data entry E15, first log data entry E16, and first log data entry E17. In various embodiments, each of the first log data entries E11 through E17 represents a log data entry associated with an operation or event directly affecting first log data source 110.

Likewise, as also seen in FIG. 1, second log data source 120 includes second log data 122, including second log data entry E21, second log data entry E22, second log data entry E23, second log data entry ED, second log data entry E25, second log data entry E26, and second log data entry E27. In various embodiments, each of the second log data entries E21 through E27 represents a log data entry associated with an operation or event directly affecting second log data source 120.

Referring now to FIG. 2A and FIG. 4 together, in response to a detected log data entry, i.e., second log data ED, in second log data 122 of the second log data source 120 that matches the defined trigger event log data entry data, at DETECT THE TRIGGER EVENT LOG ENTRY DATA IN THE SECOND LOG DATA FROM THE SECOND LOG DATA SOURCE OPERATION 411, correlation/enrichment action implementation module 150 generates log data ED insertion request 203. Consequently, second log data ED is inserted into first log data 112 of the first log data source 110 of OBTAIN ACCESS TO FIRST LOG DATA FROM A FIRST LOG DATA SOURCE OPERATION 403 so that first log data 112 is read with, and in light of, the detected trigger event log entry data, i.e., second log data ED, of second log data 122 from second log data source 120 of DETECT THE TRIGGER EVENT LOG ENTRY DATA IN THE SECOND LOG DATA FROM THE SECOND LOG DATA SOURCE OPERATION 411, and/or a portion of, or the entirety of, second log data 122 from second log data source 120 of OBTAIN ACCESS TO SECOND LOG DATA FROM A SECOND LOG DATA SOURCE OPERATION 405.

Returning to FIG. 4, in various embodiments, at INSERT AT LEAST PART OF THE SECOND LOG DATA FROM THE SECOND LOG DATA SOURCE INTO THE FIRST LOG DATA OF THE FIRST LOG DATA SOURCE OPERATION 413 the relevant portion of the second log data from the second log data source is inserted into the first log data of the first log data source manually, e.g., via human interaction with the log enrichment API; or semi-automatically, e.g., subject to review and/or approval through the log enrichment API; or automatically, e.g., based on instructions provided through the log enrichment API, but without subsequent review or approval.

Returning to the illustrative example presented above, recall a service provided through a cloud computing environment employs multiple virtual machine instances and the virtual machine instances are accessed via the Internet using variable sets of IP addresses assigned to the service by a cloud computing environment provider hosting the service. In this case, each of the virtual machine instances is a first log data source and would typically maintain its own internal first log data recording various log entries related to the events associated with that virtual machine instance, i.e., each virtual machine instance would be a first source of log data associated with that virtual machine instance.

In addition, in this specific illustrative example, the cloud computing environment provider would also maintain log data recording events associated with the cloud infrastructure, i.e., the cloud computing environment provider would be a second log data source maintaining second log data associated with the cloud infrastructure.

Recall that for the purposes of illustration, one or more of the IP addresses assigned to the service by the cloud computing environment provider are stipulated to have been cancelled/destroyed by the cloud computing environment provider. In this case, the second log entry data associated with the cloud infrastructure would include log entry data indicating the event of the one or more IP addresses being cancelled.

In addition, the first log data for each of the virtual machine instances using the cancelled IP addresses would undoubtedly also include log entry data indicating that these resources dropped offline once the IP addresses were destroyed.

Using prior systems, the first log data for each of the virtual machine instances would not be correlated with the second log data associated with the cloud infrastructure. Consequently, considerable time and energy could be expended to "discover" that the IP addresses associated with the virtual machine instances we destroyed at the infrastructure level and that this event was the cause of these virtual machine instances dropping offline. However, using process 400 for creating enriched log data, the second log entry data associated with the cloud infrastructure indicating the destruction of the IP addresses is inserted into and included with the first log entry data from the virtual machine instances indicating the instances dropped offline. Consequently, using process 400 for creating enriched log data it is immediately apparent why the virtual machine instances dropped offline.

In one embodiment, once one or more supplementation/enrichment actions are taken to add data indicating a connection between the detected matching log data entry in the second log data and the first log data of the first log data source at INSERT AT LEAST PART OF THE SECOND LOG DATA FROM THE SECOND LOG DATA SOURCE INTO THE FIRST LOG DATA OF THE FIRST LOG DATA SOURCE OPERATION 413, process flow proceeds to EXIT OPERATION 430.

In one embodiment, at EXIT OPERATION 430 process 400 for creating enriched log data is exited to await new data.

Using process 400 for creating enriched log data discussed above, log data from two or more log data sources can be effectively and efficiently supplemented to connect events, and the consequences of those events, on multiple components, assets, and/or resources implemented in different portions of a given computing environment, such as a cloud computing environment, and/or in different computing environments. Consequently, using process 400 for creating enriched log data, cause-and-effect relationships within one or more computing environments are automatically identified without the need to devote significant time and resources.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for creating enriched log data comprising:
at least one processor; and
at least one memory coupled to the at least one processor, the at least one memory having stored therein instructions which when executed by any set of the at least one processors, perform a process for creating enriched log data, the process for creating enriched log data including:
obtaining access to first log data of a first log data source, the first log data source being a first virtual machine instance;
obtaining access to distinct log data of a plurality of distinct log data sources, each of the plurality of log data sources being of different virtual machine instances distinct from virtual machine instances of each other log data source of the plurality of log data sources;
defining at least two virtual machine instance trigger events, the defined at least two virtual machine instance trigger events including a first trigger event being a security requirement setting event and a second trigger event being the creation or changing of access control lists;
defining, responsive to the at least two virtual machine instance trigger events being defined, trigger event log entry data associated with the defined at least two virtual machine instance trigger events;
monitoring, responsive to the at least two virtual machine instance trigger event being defined, log data of each log data source of the plurality of log data sources;
detecting, as a result of the monitoring, trigger event log entry data in log data of a second log data source of the plurality of log data sources;
inserting, into the first log data of the first log data source, the trigger event log data of the second log data representing the trigger event of a second virtual machine instance occurring;
detecting, as a result of the monitoring, trigger event log entry data in log data of a third log data source of the plurality of log data sources; and
inserting, into the first log data of the first log data source, the trigger event log data of the third log data representing the trigger event of the third virtual machine instance occurring.

2. The system for creating enriched log data of claim 1 wherein at least one of the first log data source and the second log data source is selected from the group of log data sources consisting of:
a virtual machine instance;
a virtual server instance;
a data store instance;
any instance in a cloud computing environment;
a non-virtual computing system;
a non-virtual server system;
a non-virtual data store;
a cloud computing environment access system;
part of a mobile device;
part of a remote sensor;
part of a laptop computing system;
part of a desktop computing system;
part of a point-of-sale computing system;
part of an ATM;
a workstation;
a storage cluster;
a switching system;
a router;
any communications system;
any form of proxy system;
a gateway system;
a firewall system;
a load balancing system;
an application;
a service; and
any virtual or non-virtual asset associated with one or more cloud computing environments.

3. The system for creating enriched log data of claim 1 wherein the at least two defined trigger events are selected from the group of trigger events consisting of:
account creation events;
the creation and or removal of communications channels;
performance metrics analysis or results;
peer communications and peer communication attempts;
user interaction and log data source availability;
failed access attempts;
successful access attempts
the abnormal termination of an application;
the increase of error rates in response to customer requests;
the detection that an Internet networking event that may impact performance is happening;
the alerting by a third party of a denial of service attack;
a change in the topology or layout used in the deployment of an application; and
information that may alter the security characteristics of an application.

4. The system for creating enriched log data of claim 1 wherein correlating the detected trigger event log entry data in the second log data from the second log data source with the first log data from the first log data source includes generating linking data, the linking data indicating the first log data should be reviewed with reference to the detected trigger event log entry data in the second log data.

5. The system for creating enriched log data of claim 4 wherein the linking data is inserted into the first log data from the first log data source manually.

6. The system for creating enriched log data of claim 4 wherein the linking data is inserted into the first log data from the first log data source semi-automatically subject to review and/or approval.

7. The system for creating enriched log data of claim 4 wherein the linking data is inserted into the first log data from the first log data source automatically.

8. A system for creating enriched log data comprising:
a first log data source, the first log data source generating first log data;
a plurality of log data sources, the plurality of log data sources generating log data independent of and external to log data of any other log data source; and
a computing system, the computing system including at least one processor and at least one memory coupled to the at least one processor, the at least one memory having stored therein instructions which when executed by any set of the one or more processors, perform a process for creating enriched log data, the process for creating enriched log data including:

obtaining access to the first log data from the first log data source;
obtaining access to the log data of the plurality of log data sources;
defining at least two virtual machine instance trigger events, the defined at least two virtual machine instance trigger events including a first trigger event being a security requirement setting event and a second trigger event being the creation or changing of access control lists;
defining, responsive to the at least two virtual machine instance trigger events being defined, trigger event log entry data associated with the defined at least two virtual machine instance trigger events;
monitoring, responsive to the at least two virtual machine instance trigger event being defined, log data of each log data source of the plurality of log data sources;
detecting, as a result of the monitoring, trigger event log entry data in log data of a second log data source of the plurality of log data sources;
inserting, into the first log data of the first log data source, the trigger event log data of the second log data representing the trigger event of a second virtual machine instance occurring;
detecting, as a result of the monitoring, trigger event log entry data in log data of a third log data source of the plurality of log data sources; and
inserting, into the first log data of the first log data source, the trigger event log data of the third log data representing the trigger event of the third virtual machine instance occurring.

9. The system for creating enriched log data of claim 8 wherein at least one of the first log data source and the second log data source is selected from the group of log data sources consisting of:
a virtual machine instance;
a virtual server instance;
a data store instance;
any instance in a cloud computing environment;
a non-virtual computing system;
a non-virtual server system;
a non-virtual data store;
a cloud computing environment access system;
part of a mobile device;
part of a remote sensor;
part of a laptop computing system;
part of a desktop computing system;
part of a point-of-sale computing system;
part of an ATM;
a workstation;
a storage cluster;
a switching system;
a router;
any communications system;
any form of proxy system;
a gateway system;
a firewall system;
a load balancing system;
an application;
a service; and
any virtual or non-virtual asset associated with one or more cloud computing environments.

10. The system for creating enriched log data of claim 8 wherein the at least two defined trigger events include one or more trigger events selected from the group of trigger events consisting of:
account creation events;
the creation and or removal of communications channels;
performance metrics analysis or results;
peer communications and peer communication attempts;
user interaction and log data source availability;
failed access attempts;
successful access attempts
the abnormal termination of an application;
the increase of error rates in response to customer requests;
the detection that an Internet networking event that may impact performance is happening;
the alerting by a third party of a denial of service attack;
a change in the topology or layout used in the deployment of an application; and
information that may alter the security characteristics of an application.

11. The system for creating enriched log data of claim 8 wherein correlating the detected trigger event log entry data in the second log data from the second log data source with the first log data from the first log data source includes generating linking data, the linking data indicating the first log data should be reviewed with reference to the detected trigger event log entry data in the second log data from the second log data source.

12. The system for creating enriched log data of claim 11 wherein the linking data is inserted into the first log data from the first log data source manually.

13. The system for creating enriched log data of claim 11 wherein the linking data is inserted into the first log data from the first log data source semi-automatically subject to review and/or approval.

14. The system for creating enriched log data of claim 11 wherein the linking data is inserted into the first log data from the first log data source automatically.

15. A system for creating enriched log data comprising:
at least one processor; and
at least one memory coupled to the at least one processor, the at least one memory having stored therein instructions which when executed by any set of the one or more processors, perform a process for creating enriched log data, the process for creating enriched log data including:
obtaining access to first log data of a first log data source, the first log data source being a first virtual machine instance;
obtaining access to distinct log data of a plurality of distinct log data sources, each of the plurality of log data sources being of different virtual machine instances distinct from virtual machine instances of each other log data source of the plurality of log data sources;
defining at least two virtual machine instance trigger events, the defined at least two virtual machine instance trigger events including a first trigger event being a removal or addition of security requirements and a second trigger event being the creation or changing of access control lists;
defining, responsive to the at least two virtual machine instance trigger events being defined, trigger event log entry data associated with the defined at least two virtual machine instance trigger events;
monitoring, responsive to the at least two virtual machine instance trigger event being defined, log data of each log data source of the plurality of log data sources;
detecting, as a result of the monitoring, trigger event log entry data in log data of a second log data source of the plurality of log data sources;

inserting, into the first log data of the first log data source, the trigger event log data of the second log data representing the trigger event of a second virtual machine instance occurring;

detecting, as a result of the monitoring, trigger event log entry data in log data of a third log data source of the plurality of log data sources; and inserting, into the first log data of the first log data source, the trigger event log data of the third log data representing the trigger event of the third virtual machine instance occurring.

16. A system for creating enriched log data comprising:

a first log data source, the first log data source generating first log data;

a second log data source, the second log data source generating second log data, the second log data source being distinct from the first log data source such that the second log data is external log data with respect to the first log data; and a computing system, the computing system including at least one processor and at least one memory coupled to the at least one processor, the at least one memory having stored therein instructions which when executed by any set of the one or more processors, perform a process for creating enriched log data, the process for creating enriched log data including:

obtaining access to first log data of a first log data source, the first log data source being a first virtual machine instance;

obtaining access to distinct log data of a plurality of distinct log data sources, each of the plurality of log data sources being of different virtual machine instances distinct from virtual machine instances of each other log data source of the plurality of log data sources;

defining at least two virtual machine instance trigger events, the defined at least two virtual machine instance trigger events including a first trigger event being a removal or addition of security requirements and a second trigger event being the creation or changing of access control lists;

defining, responsive to the at least two virtual machine instance trigger events being defined, trigger event log entry data associated with the defined at least two virtual machine instance trigger events;

monitoring, responsive to the at least two virtual machine instance trigger event being defined, log data of each log data source of the plurality of log data sources;

detecting, as a result of the monitoring, trigger event log entry data in log data of a second log data source of the plurality of log data sources;

inserting, into the first log data of the first log data source, the trigger event log data of the second log data representing the trigger event of a second virtual machine instance occurring;

detecting, as a result of the monitoring, trigger event log entry data in log data of a third log data source of the plurality of log data sources; and inserting, into the first log data of the first log data source, the trigger event log data of the third log data representing the trigger event of the third virtual machine instance occurring.

* * * * *